United States Patent
Yada et al.

(10) Patent No.: US 10,727,483 B2
(45) Date of Patent: Jul. 28, 2020

(54) OXIDE ELECTROLYTE SINTERED BODY AND METHOD FOR PRODUCING THE SAME

(71) Applicant: TOYOTA JIDOSHA KABUSHIKI KAISHA, Toyota-shi, Aichi-ken (JP)

(72) Inventors: Chihiro Yada, Numazu (JP); Shingo Ohta, Numazu (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 89 days.

(21) Appl. No.: 15/605,006

(22) Filed: May 25, 2017

(65) Prior Publication Data

US 2017/0346092 A1 Nov. 30, 2017

(30) Foreign Application Priority Data

May 27, 2016 (JP) ................. 2016-106781
Feb. 7, 2017 (JP) ................. 2017-020460

(51) Int. Cl.
*H01M 4/485* (2010.01)
*H01M 4/04* (2006.01)
(Continued)

(52) U.S. Cl.
CPC .......... *H01M 4/485* (2013.01); *C04B 35/486* (2013.01); *C04B 35/6261* (2013.01); *C04B 35/64* (2013.01); *C04B 35/6455* (2013.01); *H01M 4/0471* (2013.01); *H01M 4/131* (2013.01); *H01M 4/1391* (2013.01); *C01G 25/00* (2013.01); *C01G 33/00* (2013.01); *C01G 35/00* (2013.01); *C04B 2235/3203* (2013.01); *C04B 2235/3206* (2013.01); *C04B 2235/327* (2013.01); *C04B 2235/3208* (2013.01); *C04B 2235/3217* (2013.01); *C04B 2235/3224* (2013.01); *C04B 2235/3225* (2013.01); *C04B 2235/3227* (2013.01); *C04B 2235/3232* (2013.01); *C04B 2235/3239* (2013.01); *C04B 2235/3241* (2013.01); *C04B 2235/3244* (2013.01); *C04B 2235/3251* (2013.01); *C04B 2235/3256* (2013.01);
(Continued)

(58) Field of Classification Search
CPC .. H01M 4/0471; H01M 4/131; H01M 4/1391; H01M 4/485; H01M 10/0561; H01M 10/0562; H01M 2300/0071; C04B 35/486; C04B 35/6261; C04B 35/64; C04B 35/655; C04B 2235/3203; C04B 2235/3206; C04B 2235/3208; C04B 2235/3217; C04B 2235/3224; C04B 2235/3225; C04B 2235/3227; C04B 2235/3232; C04B 2235/3239; C04B 2235/3241; C04B 2235/3244; C04B 2235/3251; C04B 2235/3256; C04B 2235/3286; C04B 2235/3287; C04B 2235/3293; C04B 2235/3294; C04B 2235/3298; C04B 2235/44; C04B 2235/5436; C04B 2235/5445; C04B 2235/764; C04B 2235/77; C04B 2235/85; C04B 2235/96; C01G 25/00; C01G 33/00; C01G 35/00
See application file for complete search history.

(56) References Cited

U.S. PATENT DOCUMENTS 8,986,895 B2 3/2015 Ohta et al.
9,531,036 B2 12/2016 Ohta et al.
(Continued)

FOREIGN PATENT DOCUMENTS

EP 3 252 024 A1 12/2017
EP 3 410 529 A1 12/2018
(Continued)

OTHER PUBLICATIONS

Machine translation of JP 2012-096940, published on May 24, 2012 (Year: 2012).*
Gam, F., Galven, C., Bulou, A., Le Berre, F., Crosnier-Lopez, M.-P.—Reinvestigation of the Total Li+/H+ Ion Exchange on the Garnet-Type Li5La3Nb2O12, Inorg.Chem. 2014, 53, pp. 931-934, published on Jan. 7, 2014 (Year: 2014).*
U.S. Non-Final Office Action issued by the USPTO in U.S. Appl. No. 16/126,137 dated Oct. 18, 2019.
Roof I P et al., Crystal growth of a series of lithium garnets $Ln_3Li_5Ta_2O_{12}$ (Ln=La, Pr, Nd) Structural properties, Alexandrite effect and unusual ionic conductivity, Journal of Solid State Chemistry Orlando FL. US vol. 182, No. 2, Feb. 1, 2009 (Feb. 1, 2009), pp. 295-300.
(Continued)

*Primary Examiner* — Anca Eoff
(74) *Attorney, Agent, or Firm* — Sughrue Mion, PLLC

(57) ABSTRACT

An oxide electrolyte sintered body with high lithium ion conductivity and a method for producing the same, which can obtain the oxide electrolyte sintered body with high lithium ion conductivity by sintering at lower temperature than ever before. The method for producing an oxide electrolyte sintered body may comprise the steps of: preparing crystal particles of a garnet-type ion-conducting oxide which comprises Li, H, at least one kind of element L selected from the group consisting of an alkaline-earth metal and a lanthanoid element, and at least one kind of element M selected from the group consisting of a transition element that can be 6-coordinated with oxygen and typical elements belonging to the Groups 12 to 15, and which is represented by a general formula $(Li_{x-3y-z}, E_y, H_z)L_\alpha M_\beta O_\gamma$ (where E is at least one kind of element selected from the group consisting of Al, Ga, Fe and Si, $3 \le x-3y-z \le 7$, $0 \le y < 0.22$, $0 < z \le 2.8$, $2.5 \le \alpha \le 3.5$, $1.5 \le \beta \le 2.5$, and $11 \le \gamma \le 13$); preparing a lithium-containing flux; and sintering a mixture of the crystal particles of the garnet-type ion-conducting oxide and the flux by heating at 400° C. or more and 650° C. or less.

15 Claims, 11 Drawing Sheets
(2 of 11 Drawing Sheet(s) Filed in Color)

(51) Int. Cl.

| | | |
|---|---|---|
| C04B 35/486 | (2006.01) | |
| C04B 35/64 | (2006.01) | |
| C04B 35/645 | (2006.01) | |
| C04B 35/626 | (2006.01) | |
| H01M 4/1391 | (2010.01) | |
| H01M 4/131 | (2010.01) | |
| C01G 25/00 | (2006.01) | |
| C01G 35/00 | (2006.01) | |
| C01G 33/00 | (2006.01) | |

(52) U.S. Cl.
CPC ............ C04B 2235/3258 (2013.01); C04B 2235/3262 (2013.01); C04B 2235/3281 (2013.01); C04B 2235/3284 (2013.01); C04B 2235/3286 (2013.01); C04B 2235/3287 (2013.01); C04B 2235/3293 (2013.01); C04B 2235/3294 (2013.01); C04B 2235/3298 (2013.01); C04B 2235/44 (2013.01); C04B 2235/5436 (2013.01); C04B 2235/5445 (2013.01); C04B 2235/764 (2013.01); C04B 2235/77 (2013.01); C04B 2235/85 (2013.01); C04B 2235/96 (2013.01)

(56) References Cited

U.S. PATENT DOCUMENTS

| | | |
|---|---|---|
| 2007/0259271 A1 | 11/2007 | Nanno et al. |
| 2010/0203383 A1 | 8/2010 | Weppner |
| 2011/0244337 A1 | 10/2011 | Ohta et al. |
| 2014/0017577 A1 | 1/2014 | Minami et al. |
| 2014/0162113 A1 | 6/2014 | Ohta et al. |
| 2014/0227614 A1 | 8/2014 | Lee et al. |
| 2015/0056519 A1 | 2/2015 | Ohta et al. |
| 2015/0099188 A1 | 4/2015 | Holme et al. |
| 2017/0222254 A1 | 8/2017 | Sakamoto et al. |
| 2018/0175446 A1 | 6/2018 | Nishizaki et al. |
| 2018/0219253 A1 | 8/2018 | Ohta |
| 2018/0248201 A1 | 8/2018 | Shimoda et al. |
| 2019/0074543 A1 | 3/2019 | Houjyou et al. |
| 2019/0088993 A1 | 3/2019 | Ohta |
| 2019/0207248 A1 | 7/2019 | Ohta |
| 2019/0207249 A1 | 7/2019 | Nakanishi et al. |
| 2019/0207250 A1 | 7/2019 | Nakanishi et al. |

FOREIGN PATENT DOCUMENTS

| | | |
|---|---|---|
| JP | 2001-210360 A | 8/2001 |
| JP | 2007-005279 A | 1/2007 |
| JP | 2012-096940 A | 5/2012 |
| JP | 2013-037992 A | 2/2013 |
| JP | 2013-219017 A | 10/2013 |
| JP | 2013-256435 A | 12/2013 |
| JP | 2014-241288 A | 12/2014 |
| JP | 2015-38030 A | 2/2015 |
| JP | 2015-041573 A | 3/2015 |
| JP | 2015-060737 A | 3/2015 |
| JP | 2016-171068 A | 9/2016 |
| WO | 2012/114193 A1 | 8/2012 |
| WO | 2017/015511 A1 | 1/2017 |
| WO | 2017/018217 A1 | 2/2017 |
| WO | 2017/130622 A1 | 8/2017 |

OTHER PUBLICATIONS

Junji Awaka et al., Single Crystal Synthesis of Cubic Garnet Related-Type Li7La3Zr2O12 by a Self-Flux Method, Key Engineering Materials, vol. 485, Jul. 4, 2011, (Jul. 4, 2011) pp. 99-102.

Awaka et al., Synthesis and structure analysis of tetragonal $Li_7La_3Zr_2O_{12}$ with the garnet-related type structure, Journal of Solid State Chemistry Orlando, FL. US, vol. 182, No. 8, Aug. 1, 2009 (Aug. 1, 2009), pp. 2046-2052.

Zhen Feng Yow et al., Effect of Li+/H+ exchange in water treated Ta-doped $Li_7La_3Zr_2O_{12}$, Solid State Ionics 292, 2016, pp. 122-129.

Non-Final Office dated Jan. 28, 2020, issued by the USPTO in U.S. Appl. No. 16/121,030.

Non Final Office Action dated Apr. 24, 2020, issued by the U.S. Patent and Trademark Office in related U.S. Appl. No. 16/126,137.

Notice of Allowance dated May 19, 2020 issued by the USPTO in U.S. Appl. No. 16/121,030.

* cited by examiner

US 10,727,483 B2

OXIDE ELECTROLYTE SINTERED BODY AND METHOD FOR PRODUCING THE SAME

CROSS-REFERENCE TO RELATED APPLICATIONS

This application is claiming priority based on Japanese Patent Application No. 2016-106781 filed May 27, 2016 and No. 2017-020460 filed Feb. 7, 2017, the contents of all of which are incorporated herein by reference in their entirety.

TECHNICAL FIELD

The disclosure relates to an oxide electrolyte sintered body and a method for producing the same.

BACKGROUND

To integrally sinter an oxide electrolyte and a cathode or anode, preventing a cathode or anode active material from reacting at an interface, is needed. Therefore, there is a demand for lowering the sintering temperature of an oxide electrolyte.

To sinter an oxide electrolyte at low temperature, there are attempts to lower the sintering temperature by addition of an additive, promote grain growth by addition of a sintering agent, form a raw material into fine particles by a coprecipitation method or the like, etc.

For example, Patent Literature 1 discloses a method for producing a garnet-type ion conducting oxide, the method comprising the steps of: mixing a base material comprising a main component represented by the basic composition $Li_{7+X-Y}(La_{3-X}, A_X)(Zr_{2-Y}, T_Y)O_{12}$ (where A is at least one of Sr and Ca; T is at least one of Nb and Ta; and X and Y satisfy the following conditions: $0 \le X \le 1.0$ and $0 \le Y < 0.75$) and additive components including lithium borate and aluminum oxide; molding the mixture; and sintering the molded product at 900° C. or less.

Patent Literature 2 discloses a garnet-type ionic conductive oxide subjected to partial substitution of Li with H.

Patent Literature 1: Japanese Patent Application Laid-Open (JP-A) No. 2015-041573

Patent Literature 2: JP-A No. 2012-096940

SUMMARY

However, there is a problem in that the sintering temperature of an oxide electrolyte cannot be dramatically lowered by general methods such as lowering the sintering temperature by addition of a traditional additive, promoting grain growth by addition of a sintering agent, and forming a raw material into fine particles by a coprecipitation method or the like.

In light of the above circumstance, the disclosed embodiments disclose an oxide electrolyte sintered body with high lithium ion conductivity and a method for producing the same, which can obtain the oxide electrolyte sintered body with high lithium ion conductivity by sintering at lower temperature than ever before.

In a first embodiment, there is provided a method for producing an oxide electrolyte sintered body, the method comprising the steps of: preparing crystal particles of a garnet-type ion-conducting oxide which comprises Li, H, at least one kind of element L selected from the group consisting of an alkaline-earth metal and a lanthanoid element, and at least one kind of element M selected from the group consisting of a transition element that can be 6-coordinated with oxygen and typical elements belonging to the Groups 12 to 15, and which is represented by a general formula $(Li_{x-3y-z}, E_y, H_z)L_\alpha M_\beta O_\gamma$ (where E is at least one kind of element selected from the group consisting of Al, Ga, Fe and Si, $3 \le x-3y-z \le 7$, $0 \le y < 0.22$, $0 < z \le 2.8$, $2.5 \le \alpha \le 3.5$, $1.5 \le \beta \le 2.5$, and $11 \le \gamma \le 13$); preparing a lithium-containing flux; and sintering a mixture of the crystal particles of the garnet-type ion-conducting oxide and the flux by heating at 400° C. or more and 650° C. or less.

The element E may be Al.

The element L may be La, and the element M may be at least one kind of element selected from the group consisting of Zr, Nb and Ta.

The element M may be at least one kind of element selected from the group consisting of Zr and Nb.

The flux may be at least one kind of compound selected from the group consisting of $LiNO_3$ and LiOH.

In the sintering step, the sintering may be carried out under a pressure condition more than the atmospheric pressure.

In the sintering step, the sintering may be carried out by hot-pressing.

The general formula may be $(Li_{x-3y-z}, Al_y, H_z)La_3(Zr_{2-\varepsilon}, Nb_\varepsilon)O_{12}$ (where $3 \le x-3y-z \le 7$, $0 \le y \le 0.2$, $0 < z \le 2.8$, and $0.25 \le \varepsilon \le 0.6$).

The general formula may be $(Li_{x-3y-z}, E_y, H_z)L_\alpha M_\beta O_\gamma$ (where E is at least one kind of element selected from the group consisting of Al and Ga, $5 \le x-3y-z \le 7$, $0 \le y < 0.22$, $0 < z \le 2.0$, $2.5 \le \alpha \le 3.5$, $1.5 \le \beta \le 2.5$, and $11 \le \gamma \le 13$).

In another embodiment, there is provided an oxide electrolyte sintered body, wherein the oxide electrolyte sintered body has grain boundaries between crystal particles of a garnet-type ion-conducting oxide which comprises Li, H, at least one kind of element L selected from the group consisting of an alkaline-earth element and a lanthanoid element, and at least one kind of element M selected from the group consisting of a transition element that can be 6-coordinated with oxygen and typical elements belonging to the Groups 12 to 15, and which is represented by a general formula $(Li_{x-3y-z}, E_y, H_z)L_\alpha M_\beta O_\gamma$ (where E is at least one kind of element selected from the group consisting of Al, Ga, Fe and Si, $3 \le x-3y-z \le 7$, $0 \le y < 0.22$, $0 \le z < 2.8$, $2.5 \le \alpha \le 3.5$, $1.5 \le \beta \le 2.5$, and $11 \le \gamma \le 13$); wherein a lithium-containing flux is present at grain boundary triple junctions between the crystal particles; and wherein the oxide electrolyte sintered body satisfies the following formula 1:

$$R_{gb}/(R_b+R_{gb}) \le 0.6 \qquad \text{Formula 1:}$$

where $R_b$ is an intragranular resistance value that is an ion conductivity resistance inside the crystal particles, and $R_{gb}$ is a grain boundary resistance value that is an ion conductivity resistance on grain boundaries between the crystal particles.

The element E may be Al.

The element L may be La, and the element M may be at least one kind of element selected from the group consisting of Zr, Nb and Ta.

The element M may be at least one kind of element selected from the group consisting of Zr and Nb.

The flux may be at least one kind of compound selected from the group consisting of $LiNO_3$ and LiOH.

The general formula may be $(Li_{x-3y-z}, Al_y, H_z)La_3(Zr_{2-\varepsilon}, Nb_\varepsilon)O_{12}$ (where $3 \le x-3y-z \le 7$, $0 \le y \le 0.2$, $0 \le z < 2.8$, and $0.2 \le \varepsilon \le 0.6$).

The general formula may be $(Li_{x-3y-z}, E_y, H_z)L_\alpha M_\beta O_\gamma$ (where E is at least one kind of element selected from the group consisting of Al and Ga, 5≤x−3y−z≤7, 0≤y<0.22, 0≤z<2.0, 2.5≤α≤3.5, 1.5≤β≤2.5, and 11≤γ≤13).

According to the disclosed embodiments, an oxide electrolyte sintered body with high lithium ion conductivity and a method for producing the same, which can obtain the oxide electrolyte sintered body with high lithium ion conductivity by sintering at lower temperature than ever before, can be provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

1. The Method for Producing the Oxide Electrolyte Sintered Body

The method for producing the oxide electrolyte sintered body according to the disclosed embodiments comprises the steps of: preparing crystal particles of a garnet-type ion-conducting oxide which comprises Li, H, at least one kind of element L selected from the group consisting of an alkaline-earth metal and a lanthanoid element, and at least one kind of element M selected from the group consisting of a transition element that can be 6-coordinated with oxygen and typical elements belonging to the Groups 12 to 15, and which is represented by a general formula $(Li_{x-3y-z},E_y,H_z)L_\alpha M_\beta O_\gamma$ (where E is at least one kind of element selected from the group consisting of Al, Ga, Fe and Si, 3≤x−3y−z≤7, 0≤y<0.22, 0<z≤2.8, 2.5≤α≤3.5, 1.5≤β≤2.5, and 11≤γ≤13); preparing a lithium-containing flux; and sintering a mixture of the crystal particles of the garnet-type ion-conducting oxide and the flux by heating at 400° C. or more and 650° C. or less.

Alteration is a problem with a battery comprising an oxide electrolyte such as a garnet-type ion-conducting oxide, which is caused by a chemical reaction of the oxide electrolyte and an active material when they are integrally sintered. Accordingly, there is a demand for preventing the chemical reaction between the oxide electrolyte and the active material, by lowering the process temperature when the oxide electrolyte and the cathode or anode are integrally sintered.

Figure 1:
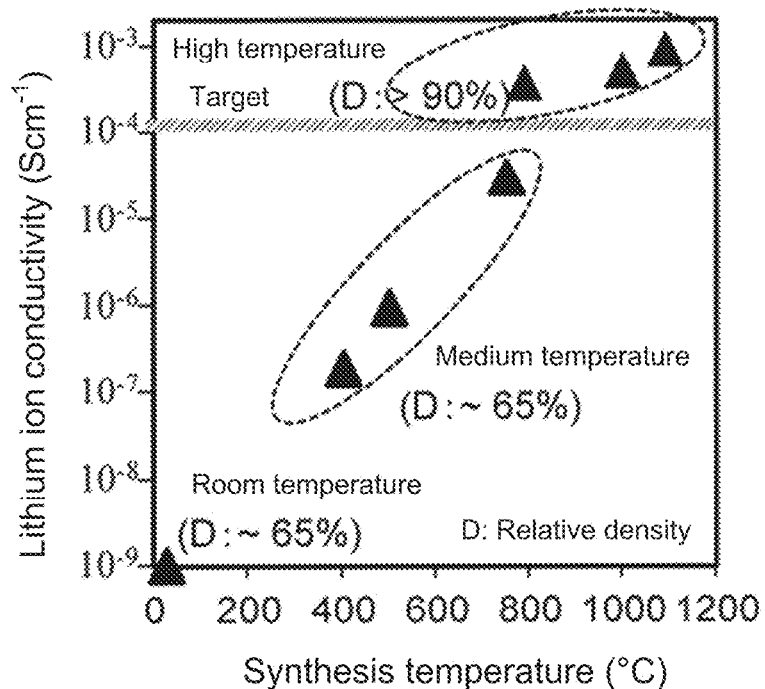
FIG. 1 is a view showing a relationship between the synthesis temperature and lithium ion conductivity of a garnet-type ion-conducting oxide.

FIG. 1 shows a correlation between the synthesis temperature and lithium ion conductivity of a bulk garnet-type ion-conducting oxide (chemical composition: $Li_{6.8}La_3Zr_{1.7}Nb_{0.3}O_{12}$) produced by a solid phase reaction method.

From FIG. 1, it is clear that the lithium ion conductivity of the garnet-type ion-conducting oxide produced by the solid phase reaction method has an almost linear relationship with the synthesis temperature.

Figure 2:
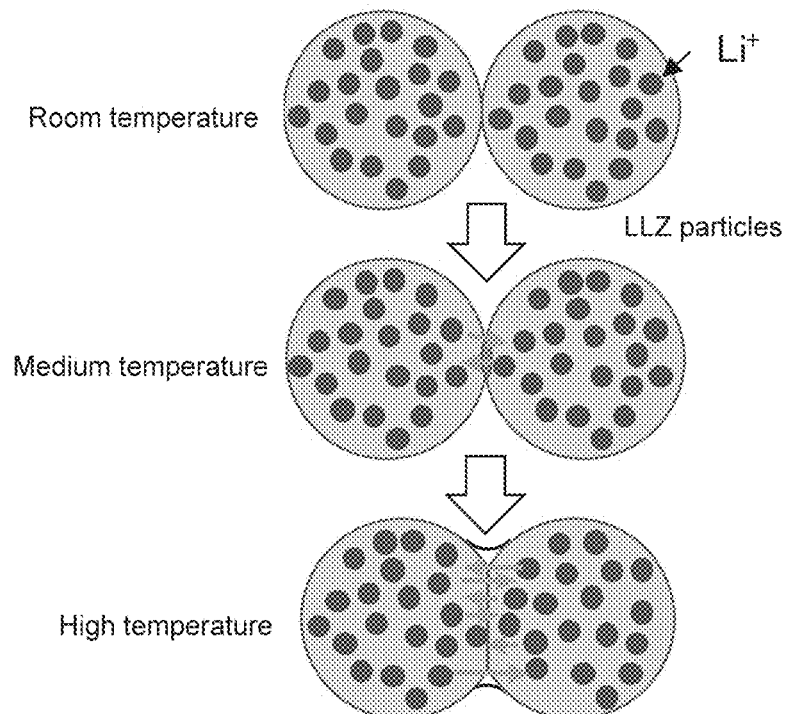
FIG. 2 is a bonding image of crystal particles of a garnet-type ion-conducting oxide.

The reason for this can be explained by use of a bonding image of the crystal particles of a garnet-type ion-conducting oxide (the crystal particles are referred to as LLZ particles in FIG. 2) in a sintering step.

When the particles of an oxide electrolyte are heated, element vibration is generally caused by external heat energy; therefore, element interdiffusion/bonding occurs between the particles. To sufficiently bond the particles, therefore, a certain degree of high temperature (e.g., 800° C. or more) is needed.

However, as described above, there is a problem in that the sintering temperature of an oxide electrolyte cannot be dramatically lowered by general methods such as lowering the sintering temperature by addition of a traditional additive, promoting grain growth by addition of a sintering agent, and forming a raw material into fine particles by a coprecipitation method or the like.

It was found that thanks to mixing the lithium-containing flux with the crystal particles of the garnet-type ion-conducting oxide represented by the general formula ($Li_{x-3y-z}$, $E_y,H_z)L_\alpha M_\beta O_\gamma$ (where E is at least one kind of element selected from the group consisting of Al, Ga, Fe and Si, $3 \leq x-3y-z \leq 7$, $0 \leq y < 0.22$, $0 < z \leq 2.8$, $2.5 \leq \alpha \leq 3.5$, $1.5 \leq \beta \leq 2.5$, and $11 \leq \gamma \leq 13$) and subjected to partial substitution of lithium ions with protons (hydrogen ions), an oxide electrolyte sintered body with sufficient lithium ion conductivity can be produced by heating even at a temperature of from 400° C. to 650° C.

That is, in the disclosed embodiments, the crystal particles of the garnet-type ion-conducting oxide are preliminarily synthesized at high temperature (such as 1000° C. or more), and part of lithium ions in the thus-obtained crystal particles of the garnet-type ion-conducting oxide are substituted with protons, thereby obtaining the crystal particles of the garnet-type ion-conducting oxide subjected to the partial substitution with the protons. Then, the crystal particles of the garnet-type ion-conducting oxide subjected to the partial substitution with the protons are mixed with the lithium-containing flux. The thus-obtained mixture is heated to resubstitute the protons in the crystal particles of the garnet-type ion-conducting oxide subjected to the partial substitution with the protons, with the lithium ions of the flux. By use of the chemical reaction caused in this resubstitution, the crystal particles of the garnet-type ion-conducting oxide are bonded at lower temperature than ever before (400° C. to 650° C.).

According to the disclosed embodiments, an oxide electrolyte sintered body with high lithium ion conductivity can be obtained by sintering at lower temperature than ever before. Therefore, alternation can be prevented in the production of the battery comprising the oxide electrolyte, which is caused by the chemical reaction between the oxide electrolyte and the electrode active material when they are integrally sintered.

Also, process costs in battery production can be reduced by lowering the sintering temperature.

It was found that the ion conductivity of an oxide electrolyte sintered body can be increased by producing the oxide electrolyte sintered body by mixing oxide electrolyte particles with a Li-containing flux material and hot-pressing the mixture.

In general, an oxide electrolyte is hard and is cracked when a load is applied.

However, by hot-pressing, oxide electrolyte particles having the composition of the disclosed embodiments cause plastic deformation and thus densification. As a result, it is considered that the density of the oxide electrolyte sintered body increases along with an increase in the bonding of the particles, thereby increasing the ion conductivity.

Figure 11:
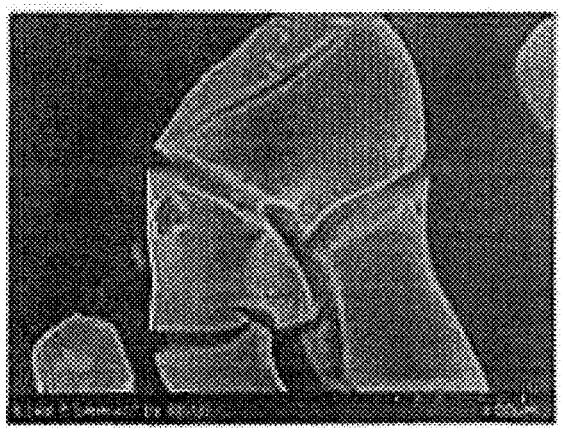
FIG. 11 is a cross-sectional SEM image of an acid-treated oxide electrolyte sintered body.

When the particles of the oxide electrolyte sintered body of the disclosed embodiments were immersed in a 0.1 M HCl solution to desorb Li, a SEM image of the particles having crystal planes as shown in FIG. 11 was obtained. From this fact, it is expected that the exchange of Li and H occurs through a specific crystal plane in the particles and not on the surface of the particles. Therefore, it is estimated that the hot-pressing in the exchange of Li and H causes slippage of the crystal planes the oxide electrolyte particles, thereby causing the plastic deformation of the particles.

The method for producing the oxide electrolyte sintered body according to the disclosed embodiments comprises at least the steps of (1) preparing the crystal particles of the garnet-type ion-conducting oxide, (2) preparing the flux, and (3) sintering a mixture of them.

(1) The Step of Preparing the Crystal Particles of the Garnet-Type Ion-Conducting Oxide The crystal particles of the garnet-type ion-conducting oxide are not particularly limited, as long as they are crystal particles of a garnet-type ion-conducting oxide which comprises Li, H, at least one kind of element L selected from the group consisting of an alkaline-earth metal and a lanthanoid element, and at least one kind of element M selected from the group consisting of a transition element that can be 6-coordinated with oxygen and typical elements belonging to the Groups 12 to 15, and which is represented by a general formula ($Li_{x-3y-z},E_y,H_z)L_\alpha M_\beta O_\gamma$ (where E is at least one kind of element selected from the group consisting of Al, Ga, Fe and Si, $3 \leq x-3y-z \leq 7$, $0 \leq y < 0.22$, $0 < z \leq 2.8$, $2.5 \leq \alpha \leq 3.5$, $1.5 \leq \beta \leq 2.5$, and $11 \leq \gamma \leq 13$).

When the composition of the Li in the general formula is $x-3y-z>7$, it is supposed that the crystal structure of the crystal particles of the garnet-type ion-conducting oxide is changed from a cubic crystal structure to a tetragonal crystal structure, thereby impairing crystal symmetry and decreasing lithium ion conductivity.

Meanwhile, when the composition of the Li in the general formula is $x-3y-z<3$, it is supposed that the potential of the 96 h site (a specific site in which the Li in the crystal structure of the crystal particles of the garnet-type ion-conducting oxide will be incorporated) increases and makes it difficult for the Li to be incorporated in the crystal, thereby decreasing Li occupancy and decreasing lithium ion conductivity.

The element E is an element that is 4-coordinated as with Li and has an ionic radius close to Li (Li: 0.59 Å).

The crystal particles of the garnet-type ion-conducting oxide may comprise, as the element E, at least one kind of element selected from the group consisting of Al, Ga, Fe and Si, at least one kind of element selected from the group consisting of Al and Ga, or an Al element.

The elements Al, Ga, Fe and Si as the element E, are major elements that are contained in garnet-type oxides that are well-known as gems.

Since Al, Ga, Fe and Si are elements that are contained in gems such as garnet, they can be substituted with the Li in the Li site.

The substitution of the Li site with the elements Al, Ga, Fe, Si, etc., has a crystal structure stabilizing effect.

On the other hand, it is supposed that the substitution with the elements Al, Ga, Fe, Si, etc., makes the property of the crystal closer to gem garnet (the Mohs hardness of gem garnet is 7.5).

As a result, it is supposed that once large amounts of Al, Ga, Fe, Si, etc., are incorporated, instead of plastic deformation, the particles cause cracking.

Therefore, it is supposed that although the addition of small amounts of Al, Ga, Fe, Si, etc., is allowed for the purpose of stabilizing the crystal structure, there is an upper limit to cause plastic deformation.

In the disclosed embodiments, since the element E in the general formula is contained in a range of $0 \leq y < 0.22$, the stability of the crystal structure of the crystal particles of the garnet-type ion-conducting oxide can be increased, and the synthesis of the crystal particles of the garnet-type ion-conducting oxide can be easy.

From the viewpoint of increasing the lithium ion conductivity, the element E in the general formula may be contained in a range of $0 \leq y < 0.12$ or in a range of $0 \leq y < 0.04$.

The element L contained in crystal particles of the garnet-type ion-conducting oxide is not particularly limited, as long as it is at least one kind of element selected from the group consisting of an alkaline-earth metal and a lanthanoid element. This is because a small change in crystal structure and high ion conductivity can be obtained. As used herein, the alkaline-earth metal is a concept that encompasses Ca, Sr, Ba and Ra. The element L may be La since higher ion conductivity can be obtained.

The element M contained in the crystal particles of the garnet-type ion-conducting oxide is not particularly limited, as long as it is at least one kind of element selected from the group consisting of a transition element that can be 6-coordinated with oxygen and typical elements belonging to the Groups 12 to 15. This is because a small change in crystal structure and higher ion conductivity can be obtained.

As the element M, examples include, but are not limited to, Sc, Y, Ti, Zr, Hf, V, Nb, Ta, Cr, Mo, W, Mn, Fe, Co, Ni, Cu, Zn, Cd, Al, Ga, Ge, Sn, Sb and Bi.

Of these elements, the element M may be at least one kind of element selected from the group consisting of Zr, Nb and Ta, from the viewpoint of obtaining a relatively large ionic radius, preventing a shrinkage in crystal lattice constant, and preventing a decrease in lithium ion conductivity. Also, the element M may be at least one kind of element selected from the group consisting of Zr and Nb, from the point of view that similar effects can be obtained since the elements have similar physical and/or chemical properties.

The ratio of the Zr and the Nb has an influence on the physical value of the lithium ion conductivity and the crystal structure. As the ratio of the Zr increases, the amount of the Li increases.

In general, when the total amount of the Li and the H is more than 6.75, the crystal structure changes from a cubic crystal structure to a tetragonal crystal structure. In general, the garnet-type ion-conducting oxide is said to have high ion conductivity when the crystal structure is a cubic crystal structure.

Therefore, when the amount of the Zr is small, the total amount of the Li and H in the composition is small and makes it easy for the garnet-type ion-conducting oxide to have a cubic crystal structure.

However, when the amount of the Zr is small, a shrinkage in lattice volume occurs.

As a result, a bottleneck for lithium ion conduction is caused to decrease conductivity.

Due to the above reason, the amount of the Zr may be in a range of from 1.4 to 1.75.

As the garnet-type ion-conducting oxide before part of the lithium ions are substituted with hydrogen ions (hereinafter it may be referred to as the garnet-type ion-conducting oxide before the hydrogen ion partial substitution), examples include, but are not limited to, $Li_{6.4}La_3Zr_{1.4}Nb_{0.6}O_{12}$, $Li_{6.5}La_3Zr_{1.7}Nb_{0.3}O_{12}$, $Li_{6.8}La_3Zr_{1.7}Nb_{0.3}O_{12}$, $(Li_{6.2}Al_{0.2})La_3Zr_{1.7}Nb_{0.3}O_{12}$, $(Li_{5.8}Al_{0.2})La_3(Zr_{1.4}Nb_{0.6})O_{12}$, $(Li_{6.1}Al_{0.13})La_3(Zr_{1.4}Nb_{0.6})O_{12}$, $(Li_{6.3}Al_{0.02})La_3(Zr_{1.4}Nb_{0.6})O_{12}$, and $(Li_{6.2}Ga_{0.2})La_3Zr_{1.7}Nb_{0.3}O_{12}$.

The amount of part of the lithium ions substituted with hydrogen ions (protons) is not particularly limited, as long as the range of z in the general formula $(Li_{x-3y-z}E_yH_z)L_\alpha M_\beta O_\gamma$ is $0<z\leq2.8$. This is because a change in crystal structure is small and the oxide electrolyte sintered body can be obtained by sintering at a lower temperature than ever before.

The method for substituting part of the lithium ions with hydrogen ions is not particularly limited. As the method, examples include, but are not limited to, stirring a powder of the garnet-type ion-conducting oxide as a raw material in pure water for about 5 days at room temperature.

The amount of part of the lithium ions substituted with hydrogen ions can be estimated by inductively-coupled plasma (ICP) analysis of the powder of the garnet-type ion-conducting oxide before and after the substitution.

That is, although the hydrogen ion amount in the garnet-type ion-conducting oxide cannot be quantitated by the inductively-coupled plasma (ICP) analysis, the lithium ion amounts in the garnet-type ion-conducting oxide before and after the hydrogen ion substitution can be quantitated.

Therefore, the amount of lithium ion change before and after the substitution can be calculated from the lithium ion amounts in the garnet-type ion-conducting oxide before and after the substitution. From the amount of the lithium ion change, it is possible to estimate how much lithium ions were substituted with hydrogen ions.

The average particle diameter of the crystal particles of the garnet-type ion-conducting oxide is not particularly limited and may be in a range of from 0.1 to 100 μm.

In the disclosed embodiments, the average particle diameter of the particles is calculated by a general method. An example of the method for calculating the average particle diameter of the particles is as follows. First, for a particle shown in an image taken at an appropriate magnitude (e.g., 50,000× to 1,000,000×) with a transmission electron microscope (hereinafter referred to as TEM) or a scanning electron microscope (hereinafter referred to as SEM), the diameter is calculated on the assumption that the particle is spherical. Such a particle diameter calculation by TEM or SEM observation is carried out on 200 to 300 particles of the same type, and the average of the particles is determined as the average particle diameter.

(2) The Flux Preparation Step

The lithium-containing flux is not particularly limited. It may be a flux that has a melting point of around a temperature at which the hydrogen ions are desorbed from the crystal particles of the garnet-type ion-conducting oxide subjected to the hydrogen ion partial substitution (hereinafter it may be referred to as the garnet-type ion-conducting oxide after the hydrogen ion partial substitution). As the flux, examples include, but are not limited to, LiOH (melting point: 462° C.), $LiNO_3$ (melting point: 260° C.) and $Li_2SO_4$ (melting point: 859° C.). From the viewpoint of lowering the sintering temperature, the flux may be LiOH or $LiNO_3$.

(3) The Sintering Step

The sintering step is a step of sintering a mixture of the crystal particles of the garnet-type ion-conducting oxide and the flux by heating at 400° C. or more and 650° C. or less.

According to the disclosed embodiments, even by sintering at 400 to 650° C., the oxide electrolyte sintered body with desired lithium ion conductivity can be obtained.

In the sintering step, a pressure is applied at the time of heating. The pressure is not particularly limited. From the viewpoint of increasing the lithium ion conductivity of the oxide electrolyte sintered body, the heating may be carried out under a pressure condition more than the atmospheric pressure. At the time of heating, the upper limit of the pressure is not particularly limited. For example, it may be 6 ton/cm² (≈588 MPa) or less.

The mixing ratio of the crystal particles of the garnet-type ion-conducting oxide and the flux is not particularly limited. It may be 50:50 (vol %) to 95:5 (vol %) since the desired oxide electrolyte sintered body can be efficiently obtained.

In the sintering step, the sintering atmosphere is not particularly limited.

In the sintering step, the sintering may be carried out by hot-pressing.

As used herein, the hot-pressing is a method of carrying out heating in an atmosphere-controlled furnace, with applying a pressure in a uniaxial direction.

By the hot-pressing, the oxide electrolyte particles cause plastic deformation and thus densification. As a result, it is considered that the density of the oxide electrolyte sintered body increases along with an increase in the bonding of the particles, thereby increasing the lithium ion conductivity.

The hot-pressing temperature may be in a range of from 400 to 650° C.

The hot-pressing pressure may be in a range of from 1 to 6 ton/cm$^2$ (≈98 to 588 MPa).

The hot-pressing time may be in a range of from 1 to 600 minutes.

In the disclosed embodiments, the crystal particles of the garnet-type ion-conducting oxide are bonded by a solid phase flux reaction method, using a chemical reaction between the flux material and the crystal particles of the garnet-type ion-conducting oxide after the hydrogen ion partial substitution (a solid phase) as driving force.

Figure 3:
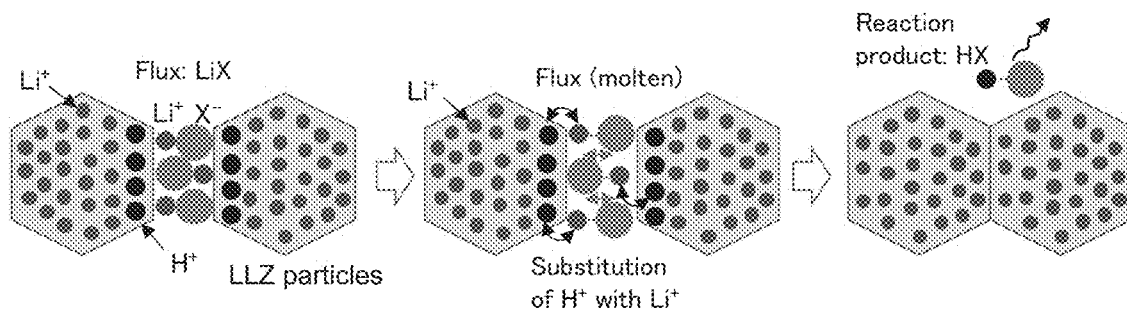
FIG. 3 is a schematic view showing the outline of a solid phase flux method used in an embodiment.

FIG. 3 is a schematic view showing the outline of a solid phase flux reaction method used in the disclosed embodiments.

The figure on the left side of FIG. 3 shows the state of the mixture "before heating". The mixture is a mixture of the flux in a solid state and the crystal particles of the garnet-type ion-conducting oxide subjected to the substitution of part of the lithium ions (Li$^+$) with hydrogen ions (H$^+$). In FIG. 3, the particles are referred to as LLZ particles.

The figure on the center of FIG. 3 shows the state of the mixture "in the initial stage of the heating". As shown in the central figure of FIG. 3, when the mixture is heated to the melting point of the flux, the bonding between the lithium ions (Li$^+$) and anions (X$^-$) in the flux becomes weak. At this time, the substitution (element diffusion) of the hydrogen ions (H$^+$) in the crystal particles of the garnet-type ion-conducting oxide with the lithium ions (Li$^+$) of the flux occurs.

Finally, the figure on the right side of FIG. 3 shows the state of the mixture "in the late stage of the heating". As shown in the right figure of FIG. 3, the lithium ions (Li$^+$) of the flux are incorporated into the crystal of the crystal particles of the garnet-type ion-conducting oxide. The hydrogen ions (H$^+$) released from the inside of the crystal of the crystal particles of the garnet-type ion-conducting oxide, are bonded to the anions (X$^-$) of the flux to form a reaction product and move outside the system; therefore, they do not remain between the crystal particles of the garnet-type ion-conducting oxide.

2. The Oxide Electrolyte Sintered Body

The oxide electrolyte sintered body of the disclosed embodiments is an oxide electrolyte sintered body wherein the oxide electrolyte sintered body has grain boundaries between crystal particles of a garnet-type ion-conducting oxide which comprises Li, H, at least one kind of element L selected from the group consisting of an alkaline-earth element and a lanthanoid element, and at least one kind of element M selected from the group consisting of a transition element that can be 6-coordinated with oxygen and typical elements belonging to the Groups 12 to 15, and which is represented by a general formula (Li$_{x-3y-z}$,E$_y$,H$_z$)L$_\alpha$M$_\beta$O$_\gamma$ (where E is at least one kind of element selected from the group consisting of Al, Ga, Fe and Si, 3≤x−3y−z≤7, 0≤y<0.22, 0≤z<2.8, 2.5≤α≤3.5, 1.5≤β≤2.5, and 11≤γ≤13); wherein a lithium-containing flux is present at grain boundary triple junctions between the crystal particles; and wherein the oxide electrolyte sintered body satisfies the following formula 1:

$$R_{gb}/(R_b+R_{gb}) \leq 0.6 \qquad \text{Formula 1:}$$

where $R_b$ is an intragranular resistance value that is an ion conductivity resistance inside the crystal particles, and $R_{gb}$ is a grain boundary resistance value that is an ion conductivity resistance on grain boundaries between the crystal particles.

The grain boundaries between the crystal particles of the oxide electrolyte and the inside of the crystal particles thereof conduct ions (e.g., lithium ions). Accordingly, the ion conductivity of the oxide electrolyte is determined based on the sum of a grain boundary resistance and an intragranular resistance (that is, the total resistance). For example, as the total resistance increases, the ion conductivity decreases. As the total resistance decreases, the ion conductivity increases. In general, it is considered that since ion conduction between the crystal particles is more difficult than ion conduction inside the crystal particles, the grain boundary resistance is large compared to the intragranular resistance. Therefore, as the ratio of the grain boundaries in the oxide electrolyte decreases, the ion conductivity of the oxide electrolyte increases.

For the oxide electrolyte sintered body of the disclosed embodiments, unlike an oxide electrolyte sintered at 1000° C. or more or an oxide electrolyte subjected to proton substitution only, the lithium-containing flux is rarely present at interfaces of the particles of the crystalline oxide electrolyte; the flux is segregated at the grain boundary triple junctions (voids between the crystal particles); and for the ion conductivity inside the oxide electrolyte sintered body, the ratio of the grain boundary resistance is 60% or less of the total resistance (the intragranular resistance+the grain boundary resistance), that is, $R_{gb}/(R_b+R_{gb}) \leq 0.6$. Therefore, the number of lithium ion conduction limiting factors is small, and the lithium ion conductivity of the oxide electrolyte sintered body is high.

The ratio $R_{gb}/(R_b+R_{gb})$ of the grain boundary resistance value $R_{gb}$ with respect to the total resistance value $R_b+R_{gb}=R_{total}$ (the sum of the intragranular resistance value $R_b$ and the grain boundary resistance value $R_{gb}$) can be calculated by AC impedance measurement.

The oxide electrolyte sintered body of the disclosed embodiments can be used as an electrode material or electrolyte material for various kinds of batteries. It can be also used as an electrode material or electrolyte material for an all-solid-state battery.

EXAMPLES

Example 1

[Garnet-Type Ion-Conducting Oxide Crystal Particle Preparation Step]

To obtain crystal particles of a garnet-type ion-conducting oxide having a composition represented by Li$_{6.8}$La$_3$Zr$_{1.7}$Nb$_{0.3}$O$_{12}$, stoichiometric amounts of LiOH(H$_2$O) (manufactured by Siguma-Aldrich), La(OH)$_3$ (manufactured by Kojundo Chemical Laboratory Co., Ltd.), ZrO$_2$ (manufactured by Kojundo Chemical Laboratory Co., Ltd.) and Nb$_2$O$_5$ (manufactured by Kojundo Chemical Laboratory Co., Ltd.) were used as a starting raw material and mixed; the resulting mixture was heated at 1000° C. (the composition of the starting raw material are shown in Table 1); and after the heating, a powder thus obtained was subjected to ICP analysis. As a result, it was found that the composition of the thus-obtained crystal particles of the garnet-type ion-conducting oxide before hydrogen ion partial substitution (in Table 1, it is referred to as "Composition of oxide before H$^+$ partial substitution") is $Li_{6.8}La_3Zr_{1.7}Nb_{0.3}O_{12}$.

Then, the thus-obtained crystal particles of the garnet-type ion-conducting oxide before hydrogen ion partial substitution, were stirred in pure water for 5 days at room temperature for partial substitution of the lithium ions with hydrogen ions, thereby obtaining the crystal particles of the garnet-type ion-conducting oxide after the hydrogen ion partial substitution.

The crystal particles were subjected to ICP analysis before and after the hydrogen ion partial substitution. The results are shown in Table 1.

As shown in Table 1, the hydrogen ion amount could not quantitated; however, from the amount of change in the lithium element, it is considered that about 1.4 of the lithium ions were substituted with hydrogen ions. That is, the composition of the thus-obtained crystal particles of the garnet-type ion-conducting oxide after the hydrogen ion partial substitution (in Table 1, it is referred to as "Composition of oxide after H$^+$ partial substitution") is estimated to be $Li_{5.4}H_{1.4}La_3Zr_{1.7}Nb_{0.3}O_{12}$

TABLE 1

|  | Li | La | Zr | Nb |
| --- | --- | --- | --- | --- |
| Composition of starting material | 6.8 | 3 | 1.7 | 0.3 |
| Composition of oxide before H$^+$ partial substitution | 6.8 | 3 | 1.7 | 0.3 |
| Composition of oxide after H$^+$ partial substitution | 5.4 | 3 | 1.7 | 0.3 |

[Flux Preparation Step]

For the crystal particles of $Li_{5.4}H_{1.4}La_3Zr_{1.7}Nb_{0.3}O_{12}$ prepared in the above-mentioned garnet-type ion-conducting oxide crystal particle preparation step, gas generated from the crystal particles was detected by TPD-mass. The result is shown in FIG. 4.

Figure 4:
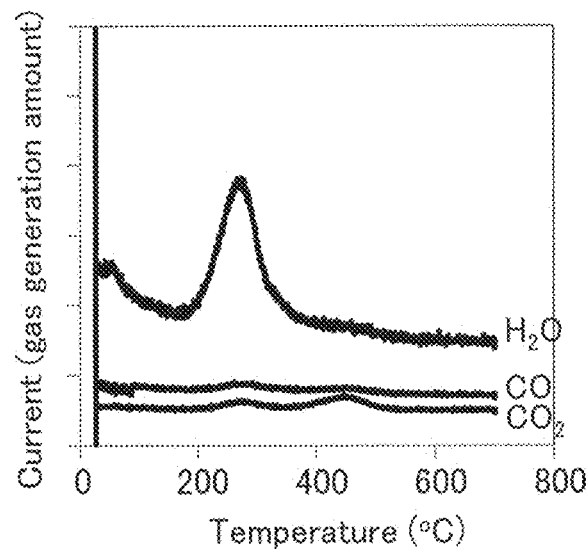
FIG. 4 is a view showing the result of TPD-mass analysis of crystal particles of a garnet-type ion-conducting oxide.

As shown in FIG. 4, the crystal particles of $Li_{5.4}H_{1.4}La_3Zr_{1.7}Nb_{0.3}O_{12}$ were found to generate H$_2$O at 280° C. Therefore, LiNO$_3$ having a melting point of 260° C. was used as a flux.

[Sintering Step]

The crystal particles of $Li_{5.4}H_{1.4}La_3Zr_{1.7}Nb_{0.3}O_{12}$ and the LiNO$_3$ powder were weighed so that the crystal particles and the powder were at a volume ratio of 75:25. Then, they were subjected to dry mixing with a mortar. The resulting mixed powder was pressed at room temperature (load: 1 ton/cm$^2$ ($\approx$98 MPa)) to obtain a pressed powder. The pressed powder was heated at 500° C. for 20 hours under a normal pressure condition, thereby obtaining an oxide electrolyte sintered body.

The pressed powder before the heating and the thus-obtained sintered body were subjected to XRD measurement. As a result, there was no peak change before and after the heating, and alteration or the like was not observed.

Example 2

An oxide electrolyte sintered body was produced in the same manner as Example 1, except that in the sintering step, the pressed powder was heated at 400° C. for 12 hours under a pressure condition (load: 1 ton/cm$^2$ ($\approx$98 MPa)) to obtain the sintered body.

Example 3

An oxide electrolyte sintered body was produced in the same manner as Example 1, except that in the flux preparation step, LiOH was prepared as the flux, and the subsequent sintering step was carried out.

Comparative Example 1

An oxide electrolyte sintered body was produced in the same manner as Example 1, except that in the garnet-type ion-conducting oxide crystal particle preparation step, crystal particles of $Li_{6.8}La_3Zr_{1.7}Nb_{0.3}O_{12}$ not subjected to hydrogen ion partial substitution, were prepared.

[Lithium Ion Conductivity Measurement]

The oxide electrolyte sintered bodies produced in Examples 1 to 3 and Comparative Example 1 were subjected to lithium ion conductivity measurement by an AC impedance measurement method using Potentiostat 1470 (manufactured by Solartron) and Impedance Analyzer FRA1255B (manufactured by Solartron) at a voltage swing of 25 mV, a measurement frequency F of 0.1 Hz to 1 MHz, and a measurement temperature of 25° C., under a normal pressure condition. The results of the lithium ion conductivity measurement are shown in Table 2.

Figure 5:
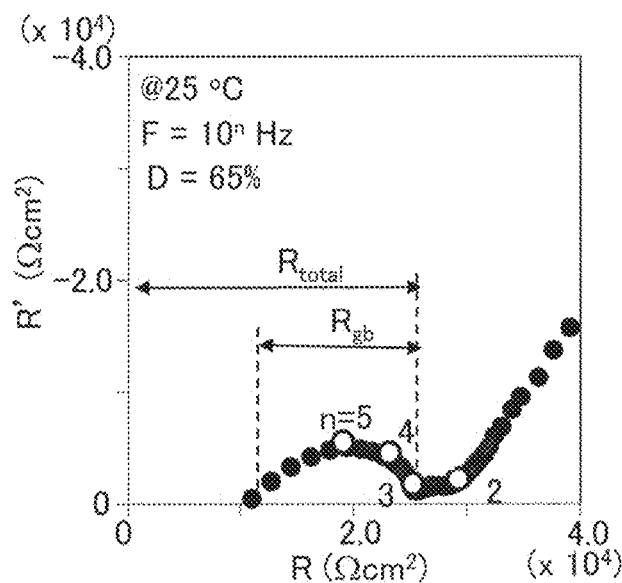
FIG. 5 is a view showing the result of AC impedance measurement of an oxide electrolyte sintered body sintered in Example 1, using $LiNO_3$ as a flux.
Figure 6:
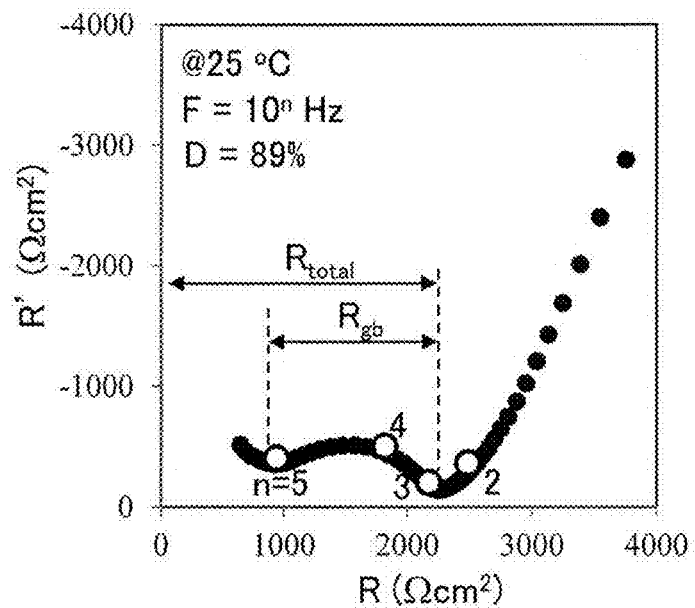
FIG. 6 is a view showing the result of AC impedance measurement of an oxide electrolyte sintered body sintered in Example 2, using $LiNO_3$ as a flux.
Figure 7:
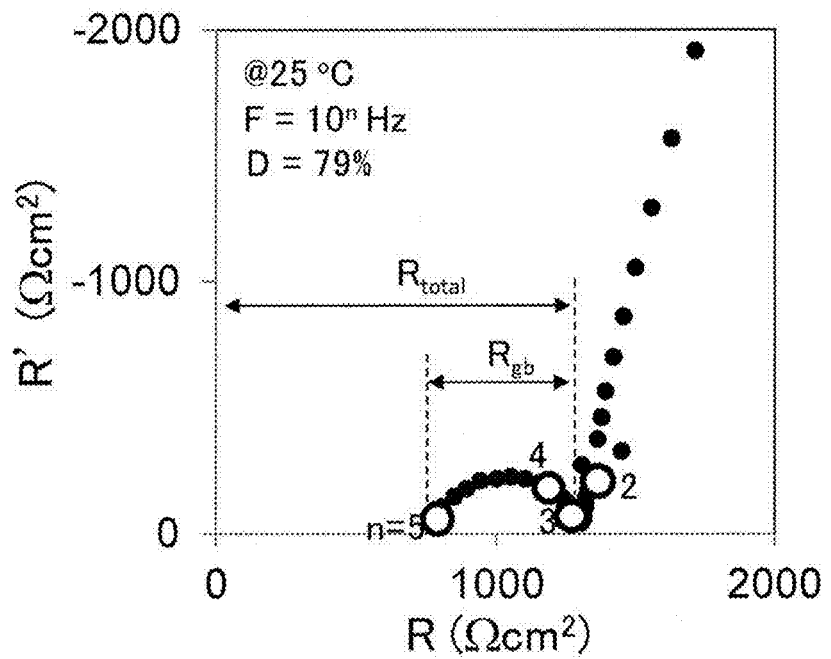
FIG. 7 is a view showing the result of AC impedance measurement of an oxide electrolyte sintered body sintered in Example 3, using LiOH as a flux.
Figure 8:
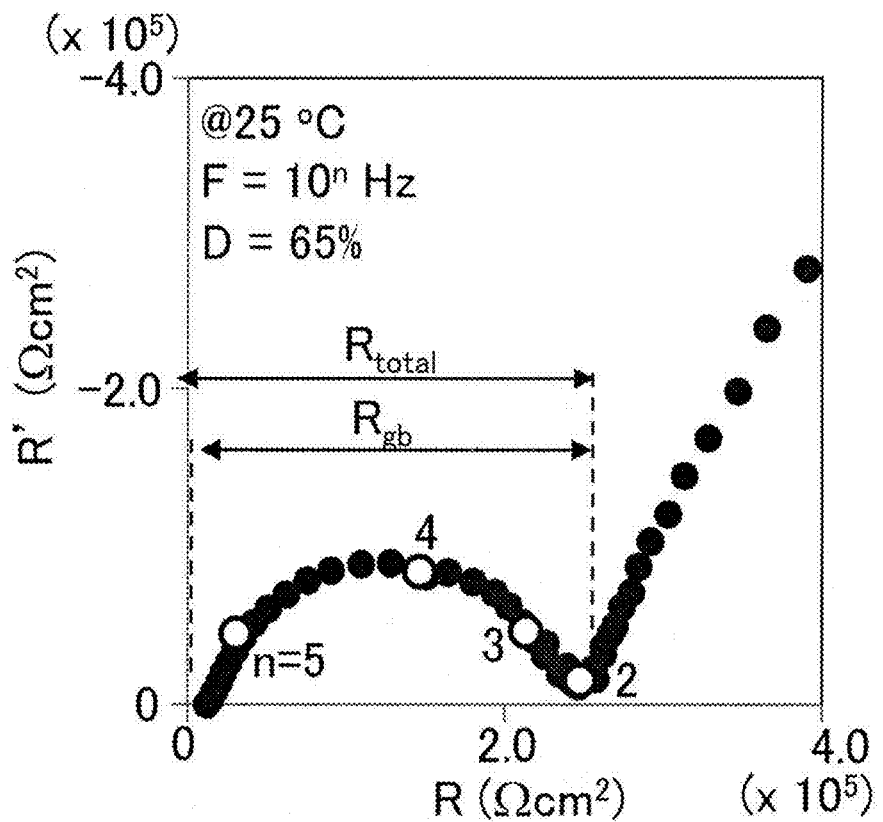
FIG. 8 is a view showing the result of AC impedance measurement of oxide electrolyte sintered body of Comparative Example 1.

Also, the results of the AC impedance measurement are shown in FIG. 5 (Example 1), FIG. 6 (Example 2), FIG. 7 (Example 3) and FIG. 8 (Comparative Example 1). FIGS. 5 to 8 show graphs with the surface resistance R' ($\Omega$ cm$^2$) of an imaginary component on the vertical axis and the surface resistance R ($\Omega$ cm$^2$) of a real component on the horizontal axis, for the oxide electrolyte sintered bodies of Examples 1 to 3 and Comparative Example 1.

From the results of the AC impedance measurement, the ratio $R_{gb}/(R_b+R_{gb}=R_{total})$ of the grain boundary resistance value $R_{gb}$ with respect to the total resistance value $R_b+R_{gb}=R_{total}$ (the sum of the intragranular resistance value $R_b$ and the grain boundary resistance value $R_{gb}$) was calculated for the oxide electrolyte sintered bodies produced in Examples 1 to 3 and Comparative Example 1. The results are shown in Table 2.

For the oxide electrolyte sintered bodies produced in Example 1 to 3 and Comparative Example 1, the relative density D (%) was calculated. A sample was obtained from each oxide electrolyte sintered body, and the relative density D (%) was calculated from the mass and outer size of the sample. The results are shown in Table 2.

TABLE 2

|  | Relative density D (%) | Lithium ion conductivity (S/cm) | $R_{gb}/R_{total}$ | Arc endpoint frequency (Hz) |
| --- | --- | --- | --- | --- |
| Comparative Example 1 | 65 | 9.0 × 10$^{-7}$ | 0.95 | 100 |
| Example 1 | 65 | 8.0 × 10$^{-6}$ | 0.60 | 1000 |
| Example 2 | 89 | 1.1 × 10$^{-4}$ | 0.55 | 1000 |
| Example 3 | 79 | 8.0 × 10$^{-5}$ | 0.40 | 1000 |

It is clear that the lithium ion conductivities of Examples 1 to 3 in which the crystal particles of $Li_{5.4}H_{1.4}La_3Zr_{1.7}Nb_{0.3}O_{12}$ (the garnet-type ion-conducting oxide subjected to the hydrogen ion partial substitution) were used, are 8.8 to 122.2 times higher than Comparative Example 1 in which the crystal particles of $Li_{6.8}La_3Zr_{1.7}Nb_{0.3}O_{12}$ (the garnet-type ion-conducting oxide not subjected to the hydrogen ion partial substitution) were used.

It is also clear that the relative density of Example 2, in which the pressed powder was heated in the sintering step under the pressure condition more than the atmospheric pressure, is higher than Example 1 in which the pressed powder was heated under the normal pressure condition; moreover, the lithium ion conductivity of Example 2 is 13.75 times higher than Example 1.

A reason why the lithium ion conductivities of Examples 1 to 3 are higher than Comparative Example 1 is because, as shown in Table 2, for each of Examples 1 to 3, the ratio $R_{gb}/(R_b+R_{gb}=R_{total}$ of the grain boundary resistance value $R_{gb}$ with respect to the total resistance value $R_{total}$ is as low as 0.6 or less.

The reason for the low grain boundary resistance ratios of Examples 1 to 3 is supposed as follows: as shown in FIGS. 5 to 8, since the arc endpoint frequencies (Hz) of Examples 1 to 3, which indicate the grain boundary resistances of Examples 1 to 3, differ from Comparative Example 1, the states of the grain boundaries of the oxide electrolyte sintered bodies of Examples 1 to 3 differ from Comparative Example 1.

[Observation of Cross-Sections of Oxide Electrolyte Sintered Bodies]

Figure 9:
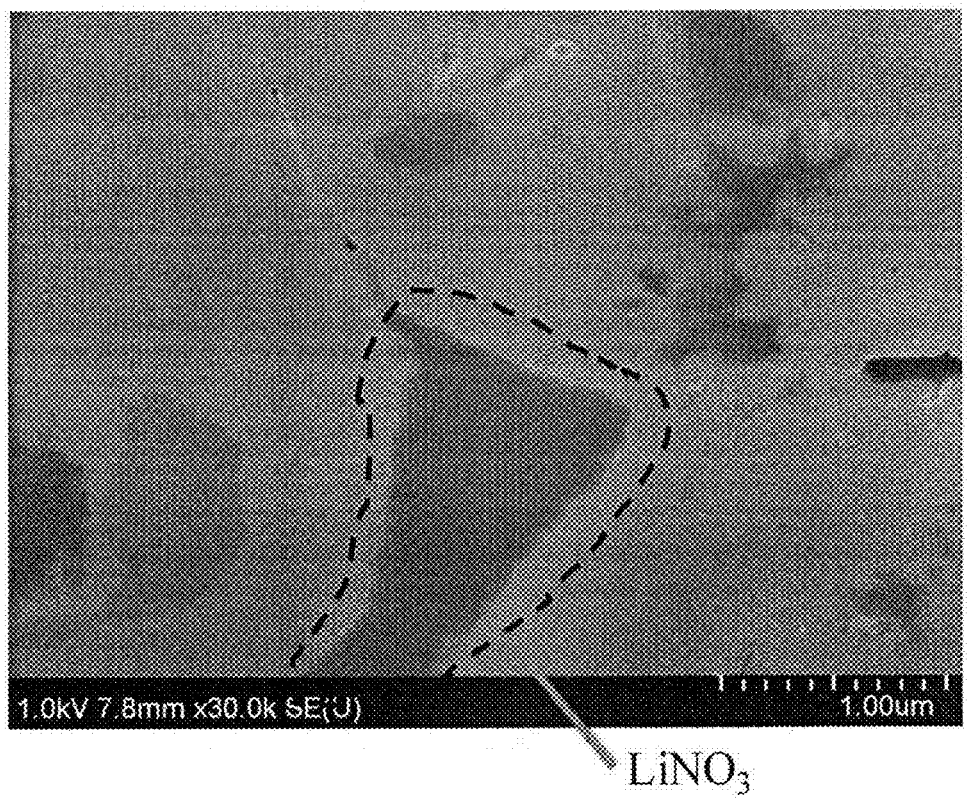
FIG. 9 is a cross-sectional SEM image of the oxide electrolyte sintered body of Example 2.
Figure 10:
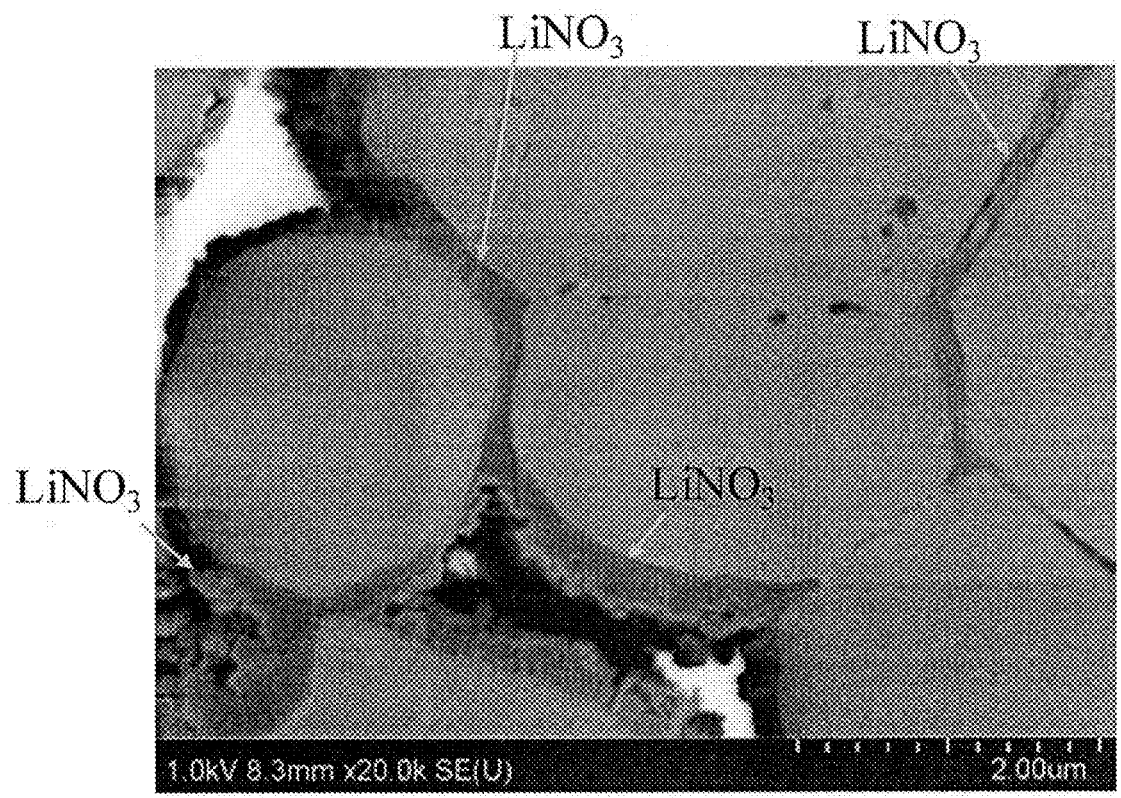
FIG. 10 is a cross-sectional SEM image of the oxide electrolyte sintered body of Comparative Example 1.

FIG. 9 shows a SEM image of a cross-section of the oxide electrolyte sintered body (subjected to ion milling at 4 kV) of Example 2. FIG. 10 shows a SEM image of a cross-section of the oxide electrolyte sintered body (subjected to ion milling at 4 kV) of Comparative Example 1.

The cross-section of the oxide electrolyte sintered body of Comparative Example 1 (FIG. 10) shows that the $LiNO_3$ remains at the interfaces (grain boundaries) of the particles of the oxide electrolyte sintered body. Therefore, it is supposed that lithium ion conduction is inhibited at the grain boundaries.

Meanwhile, the cross-section of the oxide electrolyte sintered body of Example 2 (FIG. 9) shows that the $LiNO_3$ is not present at the interfaces (grain boundaries) of the particles of the oxide electrolyte sintered body, and the $LiNO_3$ is segregated only at grain boundary triple junctions (voids between the crystal particles). Therefore, it is clear that the crystal particles of the garnet-type ion-conducting oxide are successfully bonded to each other, and the inhibition of lithium ion conduction is prevented at the grain boundaries.

Example 4

An oxide electrolyte sintered body was produced in the same manner as Example 1, except the following.

Crystal particles were prepared in the garnet-type ion-conducting oxide crystal particle preparation step, which are such that the composition of the crystal particles of the garnet-type ion-conducting oxide after the hydrogen ion partial substitution is $(Li_{3.0}H_{2.8}Al_{0.2})La_3(Zr_{1.4}Nb_{0.6})O_{12}$.

Figure 12:
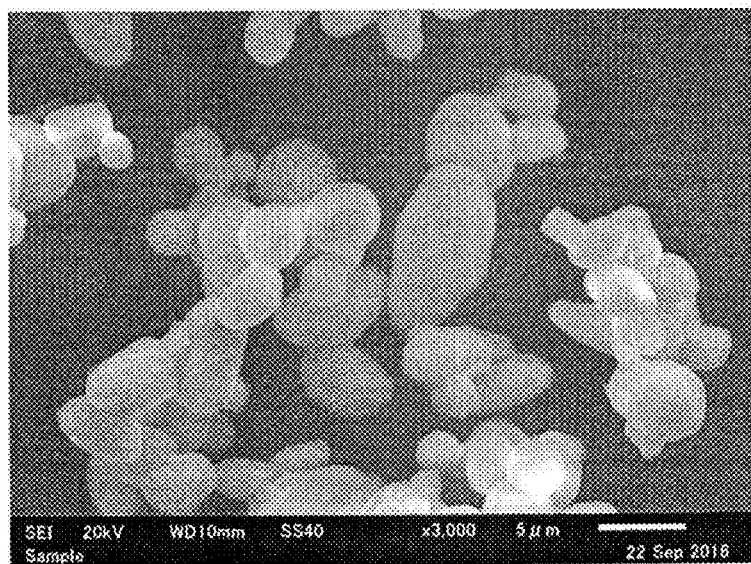
FIG. 12 is a SEM image of garnet-type ion-conducting oxide crystal particles after hydrogen ion partial substitution in Example 4.

FIG. 12 shows a SEM image of the crystal particles of the garnet-type ion-conducting oxide after the hydrogen ion partial substitution.

It was confirmed that as shown in FIG. 12, even in the case where 2.8 of the Li in the crystal particle composition was substituted with H, the garnet-type ion-conducting oxide is present as the crystal particles.

Figure 13:
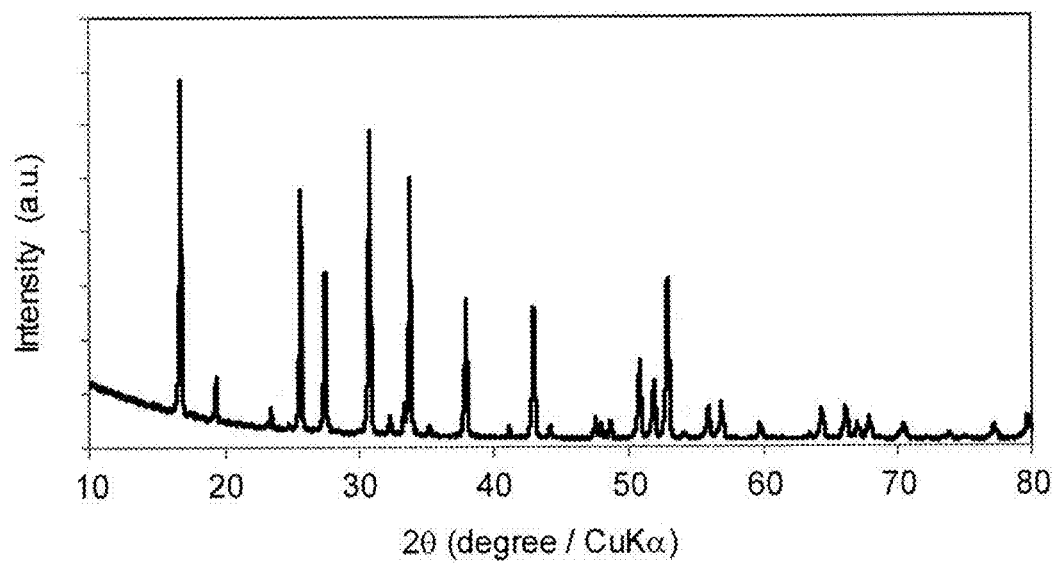
FIG. 13 shows a XRD spectrum of the garnet-type ion-conducting oxide crystal particles after the hydrogen ion partial substitution in Example 4.

FIG. 13 shows the result of XRD measurement of the crystal particles of the garnet-type ion-conducting oxide after the hydrogen ion partial substitution.

The crystal particles and the $LiNO_3$ powder were weighed so that in the sintering step, the $LiNO_3$ powder was 1.1 molar equivalent (3.08 $LiNO_3$) with respect to the H amount (2.8) in the composition of the crystal particles of $(Li_{3.0}H_{2.8}Al_{0.2})La_3(Zr_{1.4}Nb_{0.6})O_{12}$; the crystal particles and the $LiNO_3$ powder were subjected to dry mixing with a mortar; and the resulting mixed powder was hot-pressed at 400° C. and 1 ton/cm² for 480 minutes, thereby obtaining a sintered body of an oxide electrolyte.

Figure 14:
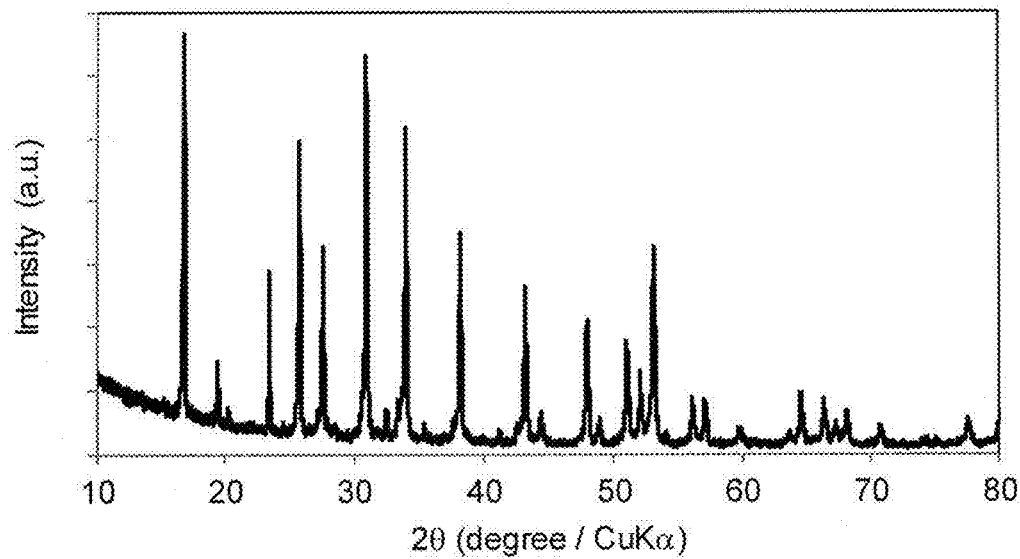
FIG. 14 is a XRD spectrum of the oxide electrolyte sintered body of Example 4.

FIG. 14 shows the result of XRD measurement of the thus-obtained oxide electrolyte sintered body.

As a result of comparing FIGS. 13 and 14, it was confirmed that the peak at 16.74° in FIG. 14 is more intense than FIG. 13. Therefore, it is clear that the H was substituted with the Li by the sintering.

Example 5

An oxide electrolyte sintered body was produced in the same manner as Example 4, except the following.

Crystal particles were prepared in the garnet-type ion-conducting oxide crystal particle preparation step, which are such that the composition of the crystal particles of the garnet-type ion-conducting oxide after the hydrogen ion partial substitution is $(Li_{5.0}H_{0.8}Al_{0.2})La_3(Zr_{1.4}Nb_{0.6})O_{12}$.

The crystal particles and the $LiNO_3$ powder were weighed so that in the sintering step, the $LiNO_3$ powder was 1.1 molar equivalent (0.88 $LiNO_3$) with respect to the H amount (0.8) in the composition of the crystal particles of $(Li_{5.0}H_{0.8}Al_{0.2})La_3(Zr_{1.4}Nb_{0.6})O_{12}$; the crystal particles and the $LiNO_3$ powder were subjected to dry mixing with a mortar; and the resulting mixed powder was hot-pressed at 400° C. and 1 ton/cm², thereby obtaining a sintered body of an oxide electrolyte.

Example 6

An oxide electrolyte sintered body was produced in the same manner as Example 4, except the following.

Crystal particles were prepared in the garnet-type ion-conducting oxide crystal particle preparation step, which are such that the composition of the crystal particles of the garnet-type ion-conducting oxide after the hydrogen ion partial substitution is $(Li_{5.1}H_{1.0}Al_{0.13})La_3(Zr_{1.4}Nb_{0.6})O_{12}$.

The crystal particles and the $LiNO_3$ powder were weighed so that in the sintering step, the $LiNO_3$ powder was 1.1 molar equivalent (1.1 $LiNO_3$) with respect to the H amount (1.0) in the composition of the crystal particles of $(Li_{5.1}H_{1.0}Al_{0.13})La_3(Zr_{1.4}Nb_{0.6})O_{12}$; the crystal particles and the $LiNO_3$ powder were subjected to dry mixing with a mortar; and the resulting mixed powder was hot-pressed at 400° C. and 1 ton/cm², thereby obtaining a sintered body of an oxide electrolyte.

Example 7

An oxide electrolyte sintered body was produced in the same manner as Example 4, except the following.

Crystal particles were prepared in the garnet-type ion-conducting oxide crystal particle preparation step, which are such that the composition of the crystal particles of the garnet-type ion-conducting oxide after the hydrogen ion partial substitution is $(Li_{5.14}H_{0.9}Al_{0.12})La_3(Zr_{1.4}Nb_{0.6})O_{12}$.

The crystal particles and the $LiNO_3$ powder were weighed so that in the sintering step, the $LiNO_3$ powder was 1.1 molar equivalent (0.99 $LiNO_3$) with respect to the H amount (0.9) in the composition of the crystal particles of $(Li_{5.14}H_{0.9}Al_{0.12})La_3(Zr_{1.4}Nb_{0.6})O_{12}$; the crystal particles and the $LiNO_3$ powder were subjected to dry mixing with a mortar; the resulting mixed powder was hot-pressed at 400° C. and 1 ton/cm², thereby obtaining a sintered body of an oxide electrolyte.

Example 8

An oxide electrolyte sintered body was produced in the same manner as Example 4, except the following.

Crystal particles were prepared in the garnet-type ion-conducting oxide crystal particle preparation step, which are such that the composition of the crystal particles of the garnet-type ion-conducting oxide after the hydrogen ion partial substitution is $(Li_{5.2}H_{1.1}Al_{0.05})La_3(Zr_{1.4}Nb_{0.6})O_{12}$.

The crystal particles and the $LiNO_3$ powder were weighed so that in the sintering step, the $LiNO_3$ powder was 1.1 molar equivalent (1.2 $LiNO_3$) with respect to the H amount (1.1) in the composition of the crystal particles of $(Li_{5.2}H_{1.1}Al_{0.05})La_3(Zr_{1.4}Nb_{0.6})O_{12}$; the crystal particles and the $LiNO_3$ powder were subjected to dry mixing with a mortar; and the resulting mixed powder was hot-pressed at 400° C. and 1 ton/cm², thereby obtaining a sintered body of an oxide electrolyte.

Example 9

An oxide electrolyte sintered body was produced in the same manner as Example 4, except the following.

Crystal particles were prepared in the garnet-type ion-conducting oxide crystal particle preparation step, which are such that the composition of the crystal particles of the garnet-type ion-conducting oxide after the hydrogen ion partial substitution is $(Li_{5.38}H_{0.9}Al_{0.04})La_3(Zr_{1.4}Nb_{0.6})O_{12}$.

The crystal particles and the $LiNO_3$ powder were weighed so that in the sintering step, the $LiNO_3$ powder was 1.1 molar equivalent (1.1 $LiNO_3$) with respect to the H amount (0.9) in the composition of the crystal particles of $(Li_{5.38}H_{0.9}Al_{0.04})La_3(Zr_{1.4}Nb_{0.6})O_{12}$; the crystal particles and the $LiNO_3$ powder were subjected to dry mixing with a mortar; and the resulting mixed powder was hot-pressed at 400° C. and 1 ton/cm², thereby obtaining a sintered body of an oxide electrolyte.

Example 10

An oxide electrolyte sintered body was produced in the same manner as Example 4, except the following.

Crystal particles were prepared in the garnet-type ion-conducting oxide crystal particle preparation step, which are such that the composition of the crystal particles of the garnet-type ion-conducting oxide after the hydrogen ion partial substitution is $(Li_{5.3}H_{1.0}Al_{0.02})La_3(Zr_{1.4}Nb_{0.6})O_{12}$.

The crystal particles and the $LiNO_3$ powder were weighed so that in the sintering step, the $LiNO_3$ powder was 1.1 molar equivalent (1.1 $LiNO_3$) with respect to the H amount (1.0) in the composition of the crystal particles of $(Li_{5.3}H_{1.0}Al_{0.02})La_3(Zr_{1.4}Nb_{0.6})O_{12}$; the crystal particles and the $LiNO_3$ powder were subjected to dry mixing with a mortar; and the resulting mixed powder was hot-pressed at 400° C. and 1 ton/cm², thereby obtaining a sintered body of an oxide electrolyte.

Example 11

An oxide electrolyte sintered body was produced in the same manner as Example 4, except the following.

Crystal particles were prepared in the garnet-type ion-conducting oxide crystal particle preparation step, which are such that the composition of the crystal particles of the garnet-type ion-conducting oxide after the hydrogen ion partial substitution is $(Li_{5.5}H_{0.9})La_3(Zr_{1.4}Nb_{0.6})O_{12}$.

The crystal particles and the $LiNO_3$ powder were weighed so that in the sintering step, the $LiNO_3$ powder was 1.1 molar equivalent (0.99 $LiNO_3$) with respect to the H amount (0.9) in the composition of the crystal particles of $((Li_{5.5}H_{0.9})La_3(Zr_{1.4}Nb_{0.6})O_{12}$; the crystal particles and the $LiNO_3$ powder were subjected to dry mixing with a mortar; and the resulting mixed powder was hot-pressed at 400° C. and 1 ton/cm², thereby obtaining a sintered body of an oxide electrolyte.

[Lithium Ion Conductivity Measurement]

The lithium ion conductivities of the oxide electrolyte sintered bodies produced in Examples 4 to 11 were measured in the same manner as Examples 1 to 3. The results of the lithium ion conductivity measurement are shown in Table 3.

Figure 15:
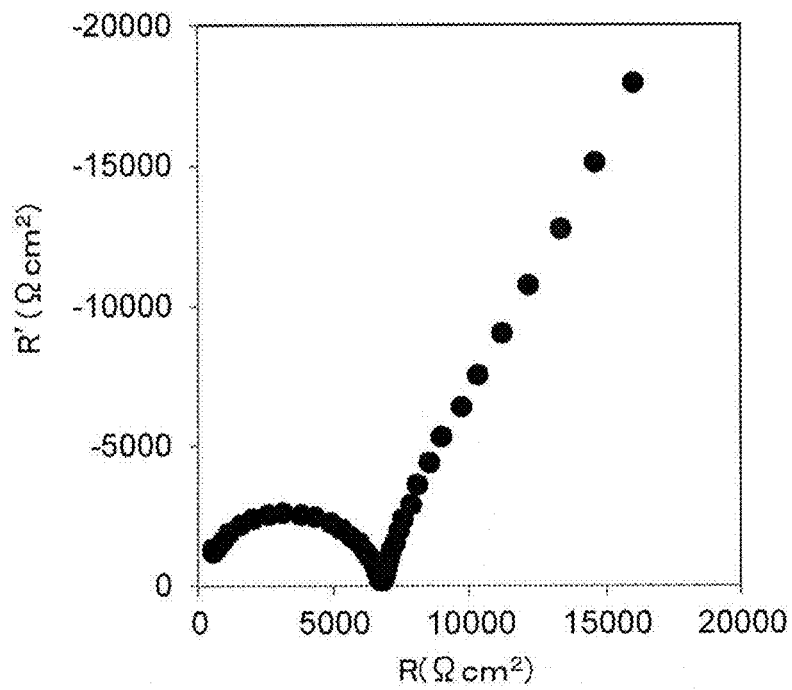
FIG. 15 is a view showing the result of AC impedance measurement of the oxide electrolyte sintered body of Example 4.

The result of AC impedance measurement of Example 4 is shown in FIG. 15. FIG. 15 shows a graph with the surface resistance R' (Ω cm²) of an imaginary component on the vertical axis and the surface resistance R (Ω cm²) of a real component on the horizontal axis, for the oxide electrolyte sintered body of Example 4.

From the result of the AC impedance measurement, for the oxide electrolyte sintered body produced in Example 4, it was found that the arc endpoint frequency is 1000 Hz. The ratio $R_{gb}/(R_b+R_{gb}=R_{total})$ of the grain boundary resistance value $R_{gb}$ with respect to the total resistance value $R_b+R_{gb}=R_{total}$ (the sum of the intragranular resistance value $R_b$ and the grain boundary resistance value $R_{gb}$) was calculated and found to be 0.44.

Therefore, it was found that the value of $R_{gb}/(R_b+R_{gb}=R_{total})$ for the oxide electrolyte sintered body produced in Example 4, is 0.6 or less.

Figure 16:
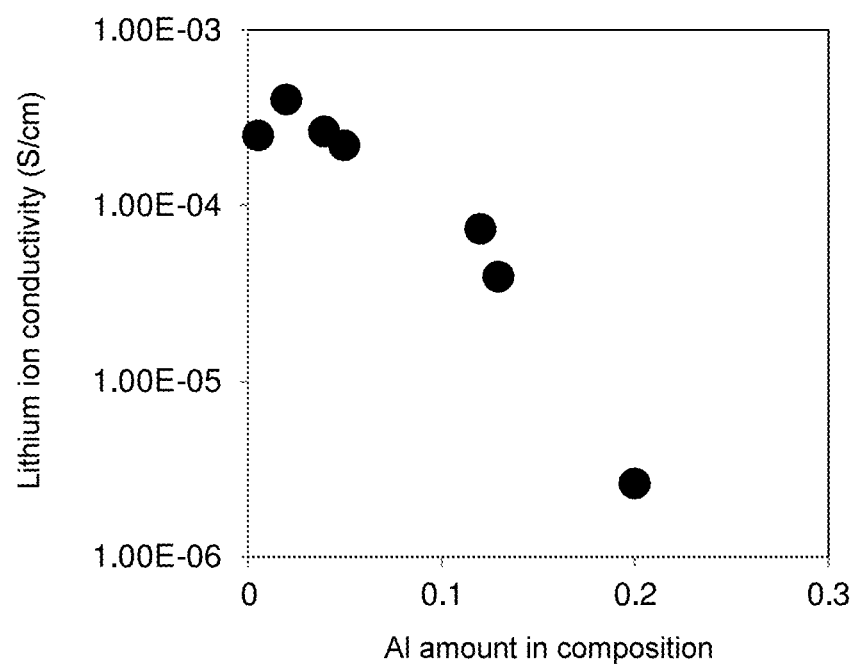
FIG. 16 is a view showing a relationship between the lithium ion conductivity of the oxide electrolyte sintered body produced in each of Examples 5 to 11 and the Al amount in the composition of the oxide electrolyte sintered body.

FIG. 16 shows the relationship between the lithium ion conductivity of the oxide electrolyte sintered body produced in each of Examples 5 to 11 and the Al amount in the composition of the oxide electrolyte sintered body.

[Relative Density Measurement]

For each of the oxide electrolyte sintered bodies produced in Examples 5 to 11, the relative density D (%) was calculated in the same manner as Examples 1 to 3. The results are shown in Table 3.

Figure 17:
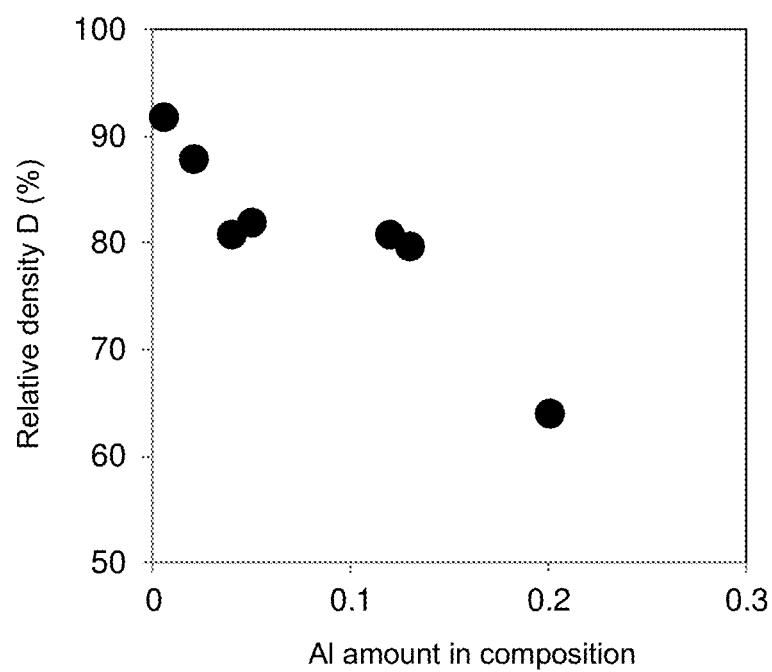
FIG. 17 is a view showing a relationship between the relative density of the oxide electrolyte sintered body produced in each of Examples 5 to 11 and the Al amount in the composition of the oxide electrolyte sintered body.

FIG. 17 shows the relationship between the relative density of the oxide electrolyte sintered body produced in each of Examples 5 to 11 and the Al amount in the composition of the oxide electrolyte sintered body.

TABLE 3

| | H partial substitution amount | Al amount in sintered body | Relative density D (%) | Lithium ion conductivity (S/cm) |
|---|---|---|---|---|
| Example 4 | 2.8 | 0.2 | 80.0 | $4.7 \times 10^{-5}$ |
| Example 5 | 0.8 | 0.2 | 64.2 | $2.6 \times 10^{-6}$ |
| Example 6 | 1.0 | 0.13 | 79.8 | $3.91 \times 10^{-5}$ |
| Example 7 | 0.9 | 0.12 | 81.2 | $7.34 \times 10^{-5}$ |
| Example 8 | 1.1 | 0.05 | 82.0 | $2.2 \times 10^{-4}$ |
| Example 9 | 0.9 | 0.04 | 85.4 | $2.6 \times 10^{-4}$ |
| Example 10 | 1.0 | 0.02 | 88.0 | $1.5 \times 10^{-4}$ |
| Example 11 | 0.9 | 0 | 92.0 | $4.5 \times 10^{-4}$ |

As shown in Table 3, the relative densities of the oxide electrolyte sintered bodies of Examples 4 to 11 are as follows: 80.0% in Example 4, 64.2% in Example 5, 79.8% in Example 6, 81.2% in Example 7, 82.0% in Example 8, 85.4% in Example 9, 88.0% in Example 10, and 92.0% in Example 11.

As shown in Table 3, the lithium ion conductivities of the oxide electrolyte sintered bodies of Examples 4 to 11 are as follows: $4.7 \times 10^{-5}$ S/cm in Example 4, $2.6 \times 10^{-6}$ S/cm in Example 5, $3.91 \times 10^{-5}$ S/cm in Example 6, $7.34 \times 10^{-5}$ S/cm in Example 7, $2.2 \times 10^{-4}$ S/cm in Example 8, $2.6 \times 10^{-4}$ S/cm in Example 9, $1.5 \times 10^{-4}$ S/cm in Example 10, and $4.5 \times 10^{-4}$ S/cm in Example 11.

It is clear that the lithium ion conductivities of the oxide electrolyte sintered bodies obtained by the hot-pressing in Examples 4 to 11, are 2.9 to 500 times higher than Comparative Example 1.

For Examples 1, 2 and 11 in which the Al amount in the sintered body was 0 and the $LiNO_3$ was used as the flux, it is clear that the lithium ion conductivity of the oxide electrolyte sintered body obtained by the hot-pressing in Example 11, is 4.1 to 56.3 times higher than the oxide electrolyte sintered bodies not subjected to the hot-pressing in Examples 1 and 2.

As is clear from FIGS. 16 and 17, the relative density of the oxide electrolyte sintered body and the lithium ion conductivity largely depend on the Al amount in the composition of the oxide electrolyte sintered body.

More specifically, it is clear that as the Al amount in the composition of the oxide electrolyte sintered body decreases, the relative density and the lithium ion conductivity increase. This is considered to be because as the Al amount in the composition of the oxide electrolyte sintered body decreases, the oxide electrolyte particles are more likely to cause desired plastic deformation and be dense.

As described above, the value of $R_{gb}/(R_b+R_{gb}=R_{total})$ for the oxide electrolyte sintered body of Example 4 is 0.44 and is 0.6 or less. Therefore, the values of $R_{gb}/(R_b+R_{gb}=R_{total})$ for the oxide electrolyte sintered bodies of Examples 5 to 11, which were sintered in the same condition as Example 4, are also estimated to be 0.6 or less.

[Observation of Cross-Sections of Oxide Electrolyte Sintered Bodies]

Figure 18:
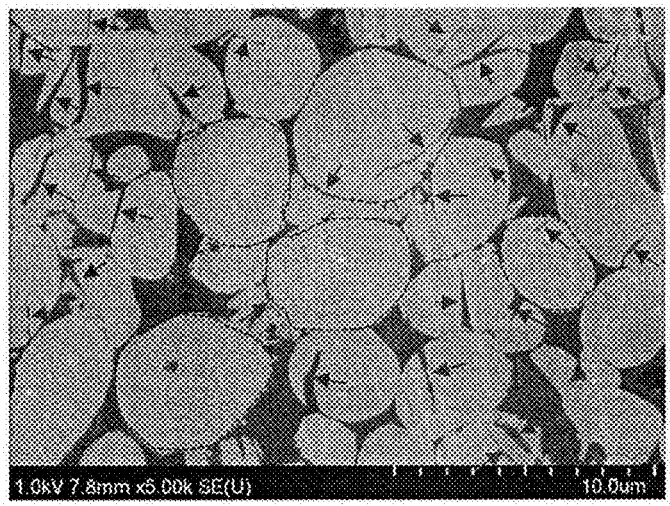
FIG. 18 is a cross-sectional SEM image of the oxide electrolyte sintered body of Example 5.
Figure 19:
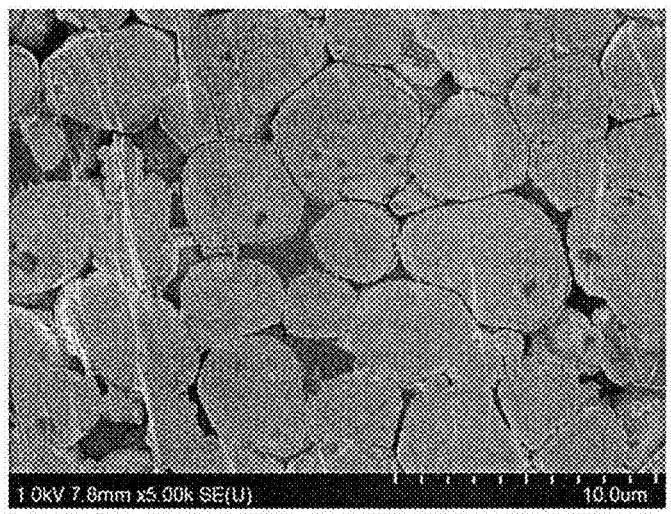
FIG. 19 is a cross-sectional SEM image of the oxide electrolyte sintered body of Example 6.
Figure 20:
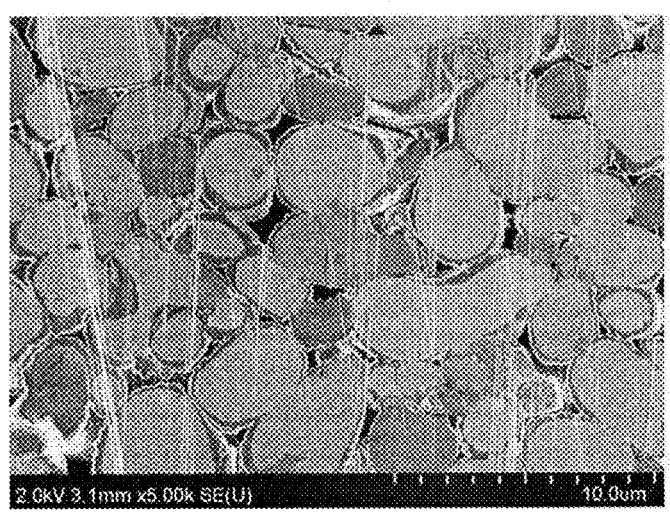
FIG. 20 is a cross-sectional SEM image of the oxide electrolyte sintered body of Example 7.
Figure 21:
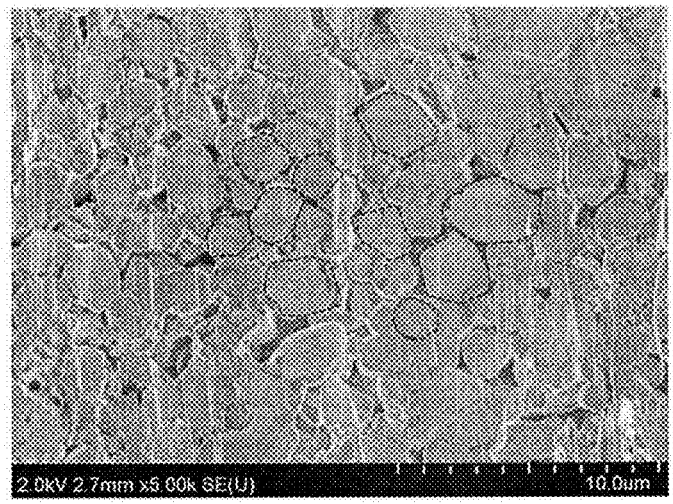
FIG. 21 is a cross-sectional SEM image of the oxide electrolyte sintered body of Example 8.
Figure 22:
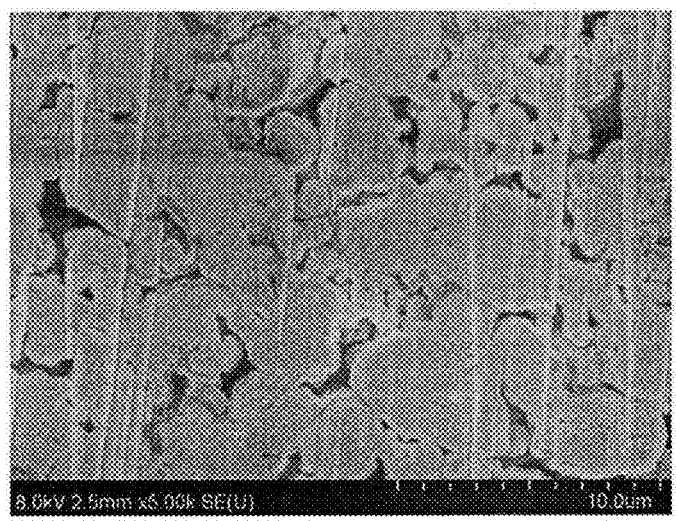
FIG. 22 is a cross-sectional SEM image of the oxide electrolyte sintered body of Example 9.
Figure 23:
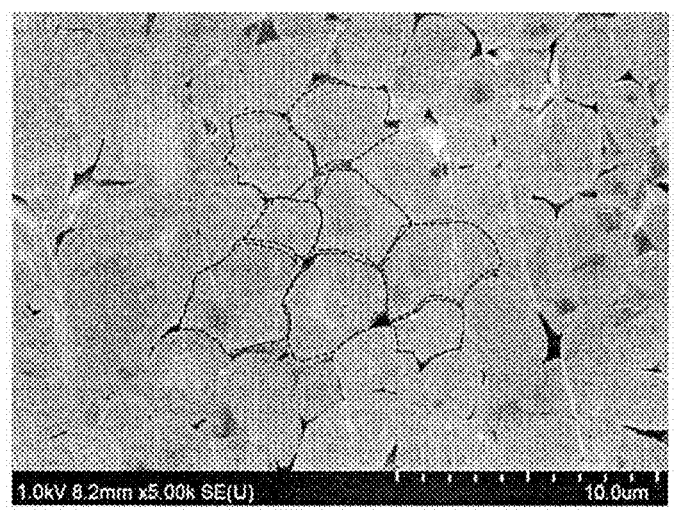
FIG. 23 is a cross-sectional SEM image of the oxide electrolyte sintered body of Example 10.
Figure 24:
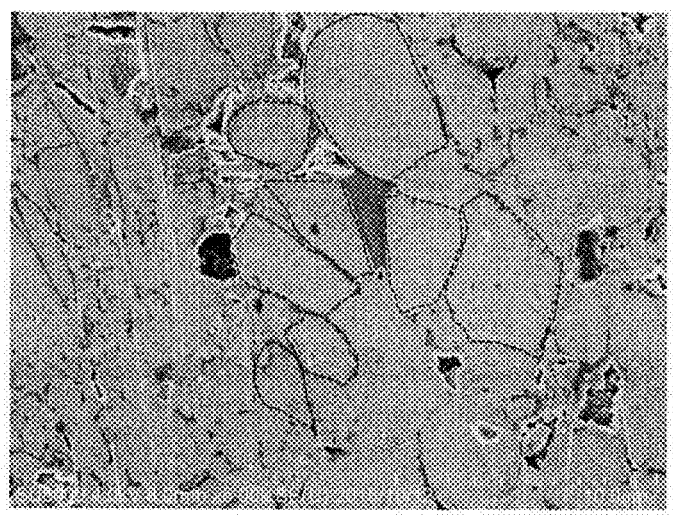
FIG. 24 is a cross-sectional SEM image of the oxide electrolyte sintered body of Example 11.

SEM images of cross-sections of the oxide electrolyte sintered bodies (subjected to ion milling at 4 kV) of Examples 5 to 11 are shown in FIG. 18 (Example 5), FIG. 19 (Example 6), FIG. 20 (Example 7), FIG. 21 (Example 8), FIG. 22 (Example 9), FIG. 23 (Example 10) and FIG. 24 (Example 11).

As shown in FIGS. 18 to 24, in the cross-sections of the oxide electrolyte sintered bodies of Examples 5 to 11, the $LiNO_3$ is rarely present at the interfaces (grain boundaries) of the particles of the oxide electrolyte sintered body, and the $LiNO_3$ is segregated only at grain boundary triple junctions (voids between the crystal particles). Therefore, it is clear that the crystal particles of the garnet-type ion-conducting oxide are successfully bonded to each other, and the inhibition of lithium ion conduction at the grain boundaries is prevented.

Arrows shown in FIG. 18 indicate cracks generated at the time of the pressing.

The invention claimed is:

1. A method for producing an oxide electrolyte sintered body, the method comprising the steps of:
   preparing crystal particles of a garnet-type ion-conducting oxide which comprises Li, H, at least one kind of element L selected from the group consisting of an alkaline-earth metal and a lanthanoid element, and at least one kind of element M selected from the group consisting of a transition element that can be 6-coordinated with oxygen and elements belonging to the Groups 12 to 15, and which is represented by a general formula $(Li_{x-3y-z},E_y,H_z)L_\alpha M_\beta O_\gamma$ (where E is at least one kind of element selected from the group consisting of Al, Ga, Fe and Si, $3 \leq x-3y-z \leq 7$, $0 \leq y < 0.22$, $0 < z \leq 2.8$, $2.5 \leq \alpha \leq 3.5$, $1.5 \leq \beta \leq 2.5$, and $11 \leq \gamma \leq 13$);
   preparing a lithium-containing flux; and
   sintering a mixture of the crystal particles of the garnet-type ion-conducting oxide and the flux by heating at 400° C. or more and 650° C. or less.

2. The method for producing the oxide electrolyte sintered body according to claim 1, wherein the element E is Al.

3. The method for producing the oxide electrolyte sintered body according to claim 1, wherein the element L is La, and the element M is at least one kind of element selected from the group consisting of Zr, Nb and Ta.

4. The method for producing the oxide electrolyte sintered body according to claim 1, wherein the element M is at least one kind of element selected from the group consisting of Zr and Nb.

5. The method for producing the oxide electrolyte sintered body according to claim 1, wherein the flux is at least one kind of compound selected from the group consisting of $LiNO_3$ and LiOH.

6. The method for producing the oxide electrolyte sintered body according to claim 1, wherein, in the sintering step, the sintering is carried out under a pressure condition more than the atmospheric pressure.

7. The method for producing the oxide electrolyte sintered body according to claim 1, wherein, in the sintering step, the sintering is carried out by hot-pressing.

8. The method for producing the oxide electrolyte sintered body according to claim 1, wherein the general formula is $(Li_{x-3y-z},Al_y,H_z)La_3(Zr_{2-\varepsilon},Nb_\varepsilon)O_{12}$ (where $3 \leq x-3y-z \leq 7$, $0 \leq y \leq 0.2$, $0 < z \leq 2.8$, and $0.25 \leq \varepsilon \leq 0.6$).

9. The method for producing the oxide electrolyte sintered body according to claim 1, wherein the general formula is $(Li_{x-3y-z},E_y,H_z)L_\alpha M_\beta O_\gamma$ (where E is at least one kind of element selected from the group consisting of Al and Ga, $5 \leq x-3y-z \leq 7$, $0 \leq y \leq 0.22$, $0 < z \leq 2.0$, $2.5 \leq \alpha \leq 3.5$, $1.5 \leq \beta \leq 2.5$, and $11 \leq \gamma \leq 13$).

10. An oxide electrolyte sintered body,
   wherein the oxide electrolyte sintered body has grain boundaries between crystal particles of a garnet-type ion-conducting oxide which comprises Li, H, at least one kind of element L selected from the group consisting of an alkaline-earth element and a lanthanoid element, and at least one kind of element M selected from the group consisting of a transition element that can be 6-coordinated with oxygen and elements belonging to the Groups 12 to 15, and which is represented by a general formula $(Li_{x-3y-z},E_y,H_z)L_\alpha M_\beta O_\gamma$ (where E is at least one kind of element selected from the group consisting of Al, Ga, Fe and Si, $3 \leq x-3y-z \leq 7$, $0 \leq y \leq 0.22$, $0 \leq z \leq 2.8$, $2.5 \leq \alpha \leq 3.5$, $1.5 \leq \beta \leq 2.5$, and $11 \leq \gamma \leq 13$);
   wherein a lithium-containing flux is present at grain boundary triple junctions between the crystal particles; and
   wherein the oxide electrolyte sintered body satisfies the following formula 1:

$$R_{gb}/(R_b+R_{gb}) \leq 0.6 \qquad \text{Formula 1:}$$

where $R_b$ is an intragranular resistance value that is an ion conductivity resistance inside the crystal particles, and $R_{gb}$ is a grain boundary resistance value that is an ion conductivity resistance on grain boundaries between the crystal particles, and wherein the lithium-containing flux is at least one kind of compound selected from the group consisting of $LiNO_3$ and LiOH.

11. The oxide electrolyte sintered body according to claim 10, wherein the element E is Al.

12. The oxide electrolyte sintered body according to claim 10, wherein the element L is La, and the element M is at least one kind of element selected from the group consisting of Zr, Nb and Ta.

13. The oxide electrolyte sintered body according to claim 10, wherein the element M is at least one kind of element selected from the group consisting of Zr and Nb.

14. The oxide electrolyte sintered body according to claim 10, wherein the general formula is $(Li_{x-3y-z}, Al_y, H_z)La_3(Zr_{2-\varepsilon}, Nb_\varepsilon)O_{12}$ (where $3 \leq x-3y-z \leq 7$, $0 \leq y \leq 0.2$, $0 \leq z < 2.8$, and $0.25 \leq \varepsilon \leq 0.6$).

15. The oxide electrolyte sintered body according to claim 10, wherein the general formula is $(Li_{x-3y-z}, E_y, H_z)L_\alpha M_\beta O_\gamma$ (where E is at least one kind of element selected from the group consisting of Al and Ga, $5 \leq x-3y-z \leq 7$, $0 \leq y < 0.22$, $0 \leq z < 2.0$, $2.5 \leq \alpha \leq 3.5$, $1.5 \leq \beta \leq 2.5$, and $11 \leq \gamma \leq 13$).

* * * * *